(12) United States Patent
Wu et al.

(10) Patent No.: US 11,782,912 B2
(45) Date of Patent: Oct. 10, 2023

(54) ASSET USER DISCOVERY DATA CLASSIFICATION AND RISK EVALUATION

(71) Applicant: Lucidum, Inc., San Jose, CA (US)

(72) Inventors: Shuning Wu, Mountain View, CA (US); Wangyan Feng, Sunnyvale, CA (US); Joel M. Fulton, Cincinnati, OH (US)

(73) Assignee: Lucidum, Inc., San Jose, CA (US)

( * ) Notice: Subject to any disclaimer, the term of this patent is extended or adjusted under 35 U.S.C. 154(b) by 644 days.

(21) Appl. No.: 16/995,117

(22) Filed: Aug. 17, 2020

(65) Prior Publication Data

US 2022/0050828 A1 Feb. 17, 2022

(51) Int. Cl.
*G06F 16/00* (2019.01)
*G06F 16/242* (2019.01)
(Continued)

(52) U.S. Cl.
CPC .......... *G06F 16/243* (2019.01); *G06F 16/244* (2019.01); *G06F 16/24578* (2019.01); *G06F 16/285* (2019.01); *G06F 18/214* (2023.01); *G06F 40/284* (2020.01); *G06N 20/00* (2019.01); *H04L 43/026* (2013.01); *H04L 43/062* (2013.01)

(58) Field of Classification Search
CPC .......... G06F 21/55; G06F 21/50; G06F 40/00; G06F 40/10; G06F 40/103; G06F 40/20; G06F 40/216; G06F 40/226; G06F 40/274; G06F 40/284; G06F 40/295; G06F 40/289; G06F 40/279; G06F 40/35; G06F 40/30; G06F 11/3438; G06F 11/3476; G06F 16/00; G06F 16/125; G06F 16/113; G06F 16/11; G06F 16/137; G06F 16/148; G06F 16/152; G06F 16/1734; G06F 21/60
See application file for complete search history.

(56) References Cited

U.S. PATENT DOCUMENTS 11,138,899 B2 * 10/2021 Agley ...................... G06N 7/01
11,200,130 B2 * 12/2021 Tankersley ....... G06Q 10/06393
(Continued)

OTHER PUBLICATIONS

Long, Y., Bindschaedler, V., & Gunter, C. A. (2017). Towards measuring membership privacy. arXiv preprint arXiv:1712.09136. (Year: 2017).*

(Continued)

*Primary Examiner* — Edgar X Guerra-Erazo
(74) *Attorney, Agent, or Firm* — Holland & Hart LLP

(57) ABSTRACT

Methods, systems, and devices for asset discovery, user discovery, data classification, risk evaluation, and data/device security are described. The method includes retrieving data stored at one or more remote locations, summarizing the retrieved data at the one or more remote locations, transferring the summarized data from the one or more remote locations to the at least one computing device, processing the transferred data by the at least one computing device, discovering assets in technology environments, classifying data that resides on each asset of the discovered assets into a respective confidentiality group of multiple confidentiality groups, calculating one or more risk scores for the discovered assets or users of the discovered assets, or both, and performing a security action to protect data that resides on an asset of the discovered assets.

20 Claims, 12 Drawing Sheets

(51) Int. Cl.
*G06F 16/28* (2019.01)
*G06F 16/2457* (2019.01)
*G06F 40/284* (2020.01)
*H04L 43/026* (2022.01)
*H04L 43/062* (2022.01)
*G06N 20/00* (2019.01)
*G06F 18/214* (2023.01)

(56) References Cited

U.S. PATENT DOCUMENTS

| | | | |
|---|---|---|---|
| 11,281,855 B1* | 3/2022 | Archuleta | G06V 30/413 |
| 11,386,226 B2* | 7/2022 | Braghin | G06F 21/6245 |
| 2018/0024901 A1* | 1/2018 | Tankersley | G06Q 10/06393 |
| | | | 707/694 |
| 2021/0117567 A1* | 4/2021 | Braghin | G06F 21/6245 |

OTHER PUBLICATIONS

Salem, A., Zhang, Y., Humbert, M., Berrang, P., Fritz, M., & Backes, M. (2018). Ml-leaks: Model and data independent membership inference attacks and defenses on machine learning models. arXiv preprint arXiv:1806.01246. (Year: 2018).*

Shokri, R., Stronati, M., Song, C., & Shmatikov, V. (May 2017). Membership inference attacks against machine learning models. In 2017 IEEE symposium on security and privacy (SP) (pp. 3-18). IEEE. (Year: 2017).*

Q. Hu, B. Tang and D. Lin, "Anomalous User Activity Detection in Enterprise Multi-source Logs," 2017 IEEE International Conference on Data Mining Workshops (ICDMW), New Orleans, LA, USA, 2017, pp. 797-803, doi: 10.1109/ICDMW.2017.110. (Year: 2017).*

* cited by examiner

ASSET USER DISCOVERY DATA CLASSIFICATION AND RISK EVALUATION

BACKGROUND

The following relates to asset discovery, including asset discovery, user discovery, data classification, risk evaluation, and data/device security.

Data systems are widely deployed to provide various types of data communication content such as voice, video, packet data, messaging, broadcast, and so on. These data systems may be capable of processing, storage, generation, manipulation and modification of data. Examples of data systems include entertainment systems, information systems, virtual reality systems, model and simulation systems, and so on. These systems may employ a combination of hardware and software technologies to support processing, storage, generation, manipulation and modification of data information, for example, such as data capture devices, data storage devices, data communication networks, data servers, computer systems, data processing devices, and user interface devices.

Some data systems may have assets they are not aware of or may lose track of assets. Improved data systems for asset discovery are needed.

SUMMARY

The described techniques relate to improved methods, systems, devices, and apparatuses that support asset discovery, user discovery, data classification, risk evaluation, and data/device security. Generally, the described techniques provide for asset discovery, data classifications and data protection. The described techniques include retrieving data stored at one or more remote locations, summarizing the retrieved data at the one or more remote locations, and transferring the summarized data from the one or more remote locations to one or more computing devices. The described techniques include the one or more computing devices processing the transferred data and discovering, based on the processing of the transferred data, assets in information technology environments, or in operational technology environments, or in internet-of-things technology environments, or in any combination thereof, that are operating in wired networks or wireless networks, or operating in both. In some cases, discovering the assets includes discovering known assets and unknown assets. The described techniques include classifying, based on the processing of the transferred data, data that resides on each asset of the discovered assets into a respective confidentiality group of multiple confidentiality groups and calculating, based on the processing of the transferred data, one or more risk scores for the discovered assets or users of the discovered assets, or both. The described techniques include performing a security action to protect data that resides on an asset of the discovered assets based at least in part on a confidentiality group to which the data on the asset is classified and a calculated risk score of the asset or a calculated risk score of a user of the asset, or both.

A method of asset discovery, data classifications and protection, the method being performed by at least one computing device including at least one processor, the method including is described. The method may include retrieving data stored at one or more remote locations, summarizing the retrieved data at the one or more remote locations, transferring the summarized data from the one or more remote locations to the at least one computing device, processing the transferred data by the at least one computing device, discovering, based on the processing of the transferred data, assets in information technology environments, or in operational technology environments, or in internet-of-things technology environments, or in any combination thereof, that are operating in wired networks or wireless networks, or operating in both, where discovering the assets includes discovering known assets and unknown assets, classifying, based on the processing of the transferred data, data that resides on each asset of the discovered assets into a respective confidentiality group of multiple confidentiality groups, calculating, based on the processing of the transferred data, one or more risk scores for the discovered assets or users of the discovered assets, or both, and performing a security action to protect data that resides on an asset of the discovered assets based on a confidentiality group to which the data on the asset is classified and a calculated risk score of the asset or a calculated risk score of a user of the asset, or both.

An apparatus for asset discovery, data classifications and protection, the method being performed by at least one computing device including at least one processor, the method including is described. The apparatus may include a processor, memory coupled with the processor, and instructions stored in the memory. The instructions may be executable by the processor to cause the apparatus to retrieve data stored at one or more remote locations, summarize the retrieved data at the one or more remote locations, transfer the summarized data from the one or more remote locations to the at least one computing device, process the transferred data by the at least one computing device, discover, based on the processing of the transferred data, assets in information technology environments, or in operational technology environments, or in internet-of-things technology environments, or in any combination thereof, that are operating in wired networks or wireless networks, or operating in both, where discovering the assets includes discovering known assets and unknown assets, classify, based on the processing of the transferred data, data that resides on each asset of the discovered assets into a respective confidentiality group of multiple confidentiality groups, calculate, based on the processing of the transferred data, one or more risk scores for the discovered assets or users of the discovered assets, or both, and perform a security action to protect data that resides on an asset of the discovered assets based on a confidentiality group to which the data on the asset is classified and a calculated risk score of the asset or a calculated risk score of a user of the asset, or both.

Another apparatus for asset discovery, data classifications and protection, the method being performed by at least one computing device including at least one processor, the method including is described. The apparatus may include means for retrieving data stored at one or more remote locations, summarizing the retrieved data at the one or more remote locations, transferring the summarized data from the one or more remote locations to the at least one computing device, processing the transferred data by the at least one computing device, discovering, based on the processing of the transferred data, assets in information technology environments, or in operational technology environments, or in internet-of-things technology environments, or in any combination thereof, that are operating in wired networks or wireless networks, or operating in both, where discovering the assets includes discovering known assets and unknown assets, classifying, based on the processing of the transferred data, data that resides on each asset of the discovered assets into a respective confidentiality group of multiple confidentiality groups, calculating, based on the processing of the transferred data, one or more risk scores for the discovered assets or users of the discovered assets, or both, and performing a security action to protect data that resides on an asset of the discovered assets based on a confidentiality group to which the data on the asset is classified and a calculated risk score of the asset or a calculated risk score of a user of the asset, or both.

A non-transitory computer-readable medium storing code for asset discovery, data classifications and protection, the method being performed by at least one computing device including at least one processor, the method including is described. The code may include instructions executable by a processor to retrieve data stored at one or more remote locations, summarize the retrieved data at the one or more remote locations, transfer the summarized data from the one or more remote locations to the at least one computing device, process the transferred data by the at least one computing device, discover, based on the processing of the transferred data, assets in information technology environments, or in operational technology environments, or in internet-of-things technology environments, or in any combination thereof, that are operating in wired networks or wireless networks, or operating in both, where discovering the assets includes discovering known assets and unknown assets, classify, based on the processing of the transferred data, data that resides on each asset of the discovered assets into a respective confidentiality group of multiple confidentiality groups, calculate, based on the processing of the transferred data, one or more risk scores for the discovered assets or users of the discovered assets, or both, and perform a security action to protect data that resides on an asset of the discovered assets based on a confidentiality group to which the data on the asset is classified and a calculated risk score of the asset or a calculated risk score of a user of the asset, or both.

In some examples of the method, apparatuses, and non-transitory computer-readable medium described herein, calculating the one or more risk scores may include operations, features, means, or instructions for grouping the transferred data into groups that may be grouped by association to one or more of the assets or by association to users of the one or more of the assets, or both, and integrating human reinforcing learning and machine accumulative learning with the groups of transferred data, where the transferred data includes at least one of a set of file sharing logs, or a set of network flow logs, or a set of server user activities logs, or a set of internal network traffic logs, or any combination thereof.

In some examples of the method, apparatuses, and non-transitory computer-readable medium described herein, processing the transferred data may include operations, features, means, or instructions for collecting and analyzing the set of file sharing logs associated with a set of files, and grouping entries of the set of file sharing logs by username and by filename.

Some examples of the method, apparatuses, and non-transitory computer-readable medium described herein may further include operations, features, means, or instructions for removing each file extension and each stop word from filenames of the set of files that may be associated with a particular user; tokenizing each word remaining in the filenames associated with the user, using the tokenized words as bag of words input to train a machine learning topic model, and using the trained machine learning topic model to classify the data that resides on each asset of the discovered assets, or to determine a respective data topic for the data that resides on each asset of the discovered assets, or to determine a respective data type for the data that resides on each asset of the discovered assets, or any combination thereof.

Some examples of the method, apparatuses, and non-transitory computer-readable medium described herein may further include operations, features, means, or instructions for clustering, based on the trained machine learning topic model, a set of filenames from the filenames of the transferred data into a text cluster, selecting a most frequent word from a set of most frequent words from the set of filenames as a data topic for the text cluster, and outputting the text cluster, a username associated with the text cluster, and the selected data topic associated with the text cluster to an asset dataset of at least one of the assets of the discovered assets or to a user dataset of at least one of the users associated with at least one asset of the discovered assets, or both.

In some examples of the method, apparatuses, and non-transitory computer-readable medium described herein, processing the transferred data may include operations, features, means, or instructions for identifying a server that may be a type of server included in a list of server types to be analyzed, the discovered assets including the server, analyzing, of the set of network flow logs, a network flow log of the server, and determining one or more attributes of the network flow log of the server based on the analyzing.

In some examples of the method, apparatuses, and non-transitory computer-readable medium described herein, the one or more attributes of the network flow log of the server includes at least one of an edge weight for the server, one or more components connected to the server, a page rank of the server, a triangle count of nodes associated with the server, a graph centrality of the server, or any combination thereof.

Some examples of the method, apparatuses, and non-transitory computer-readable medium described herein may further include operations, features, means, or instructions for running a weighted graph model for the server based on the one or more attributes of the server, determining a model score of the server based on the weighted graph model, and outputting the model score and an IP address of the server to an asset dataset of the server, or to a user dataset of at least one of the users associated with the server, or any combination thereof.

In some examples of the method, apparatuses, and non-transitory computer-readable medium described herein, processing the transferred data may include operations, features, means, or instructions for collecting and analyzing the set of server user activities logs of a set of servers associated with the transferred data, and grouping entries of the set of server user activities logs by username and by server name.

Some examples of the method, apparatuses, and non-transitory computer-readable medium described herein may further include operations, features, means, or instructions for attaching an organization department of a set of organization departments to each username based on human resource data including associations between each username and the set of organization departments, and calculating, for each server, a total user count and a user count per organization department.

Some examples of the method, apparatuses, and non-transitory computer-readable medium described herein may further include operations, features, means, or instructions for determining, for a server from the set of servers, a highest represented organization department of the server based on the highest represented organization department having the highest user count per organization department, determining that a user count for the highest represented organization department of the server satisfies a user count threshold, applying a data type to the server based on the highest represented organization department, and applying a data classification to the server based on the applied data type.

In some examples of the method, apparatuses, and non-transitory computer-readable medium described herein, processing the transferred data may include operations, features, means, or instructions for collecting and analyzing the set of internal network traffic logs of a set of servers of an organization associated with the transferred data, and grouping entries of the set of internal network traffic logs by source IP address or by destination IP address, or both, for each traffic flow of the set internal network traffic logs.

Some examples of the method, apparatuses, and non-transitory computer-readable medium described herein may further include operations, features, means, or instructions for mapping, for each asset of the discovered assets associated with a server of the set of servers, an asset source IP address to an asset name, and a username to a name of an asset, selecting N assets of the with highest traffic to the server; and applying a data type to the server based on data associated with the N assets with highest traffic to the server, and applying a data classification to the server based on the applied data type.

In some examples of the method, apparatuses, and non-transitory computer-readable medium described herein, summarizing the retrieved data stored at the one or more remote locations may include operations, features, means, or instructions for collecting at least one of a geographic location of the data stored at the one or more remote locations, a source internet protocol (IP) address associated with the data stored at the one or more remote locations, a destination IP address associated with the data stored at the one or more remote locations, one or more preselected database fields associated with the data stored at the one or more remote locations, one or more preselected data fields of the data stored at the one or more remote locations or content from the one or more preselected data fields of the data stored at the one or more remote locations, a preselected portion of the data stored at the one or more remote locations, at least a portion of metadata associated with the data stored at the one or more remote locations, a username associated with the data stored at the one or more remote locations, or any combination thereof.

In some examples of the method, apparatuses, and non-transitory computer-readable medium described herein, summarizing the retrieved data stored at the one or more remote locations may include operations, features, means, or instructions for summarizing data on a first data source of the data stored at the one or more remote locations, or filtering the data on the first data source, or summarizing and filtering the data on the first data source, where summarizing the data on the first data source includes collecting or generating a description that describes at least a portion of the data on the first data source, and where filtering the data on the first data source includes permitting a first portion of the data on the first data source to be transferred when transferring the summarized data and blocking a second portion of the data on the first data source from being transferred.

Some examples of the method, apparatuses, and non-transitory computer-readable medium described herein may further include operations, features, means, or instructions for bypassing summarizing and filtering of data on a second data source of the data stored at the one or more remote locations, where transferring the summarized data includes transferring the non-summarized and non-filtered data on the second data source, and where the first data source and the second data source include at least one server or at least one database, or both, associated with the data stored at one or more remote locations.

Some examples of the method, apparatuses, and non-transitory computer-readable medium described herein may further include operations, features, means, or instructions for using, based on processing the transferred data, network traffic data to discover a user of at least one of the discovered assets, where processing the transferred data by the at least one computing device includes processing the network traffic data that includes remote desktop protocol (RDP) traffic data, or virtual network computing (VNC) traffic data, or secure shell (SSH) traffic data, or remote frame buffer protocol (RFBP) traffic data, or any combination thereof.

DETAILED DESCRIPTION

Figure 1:
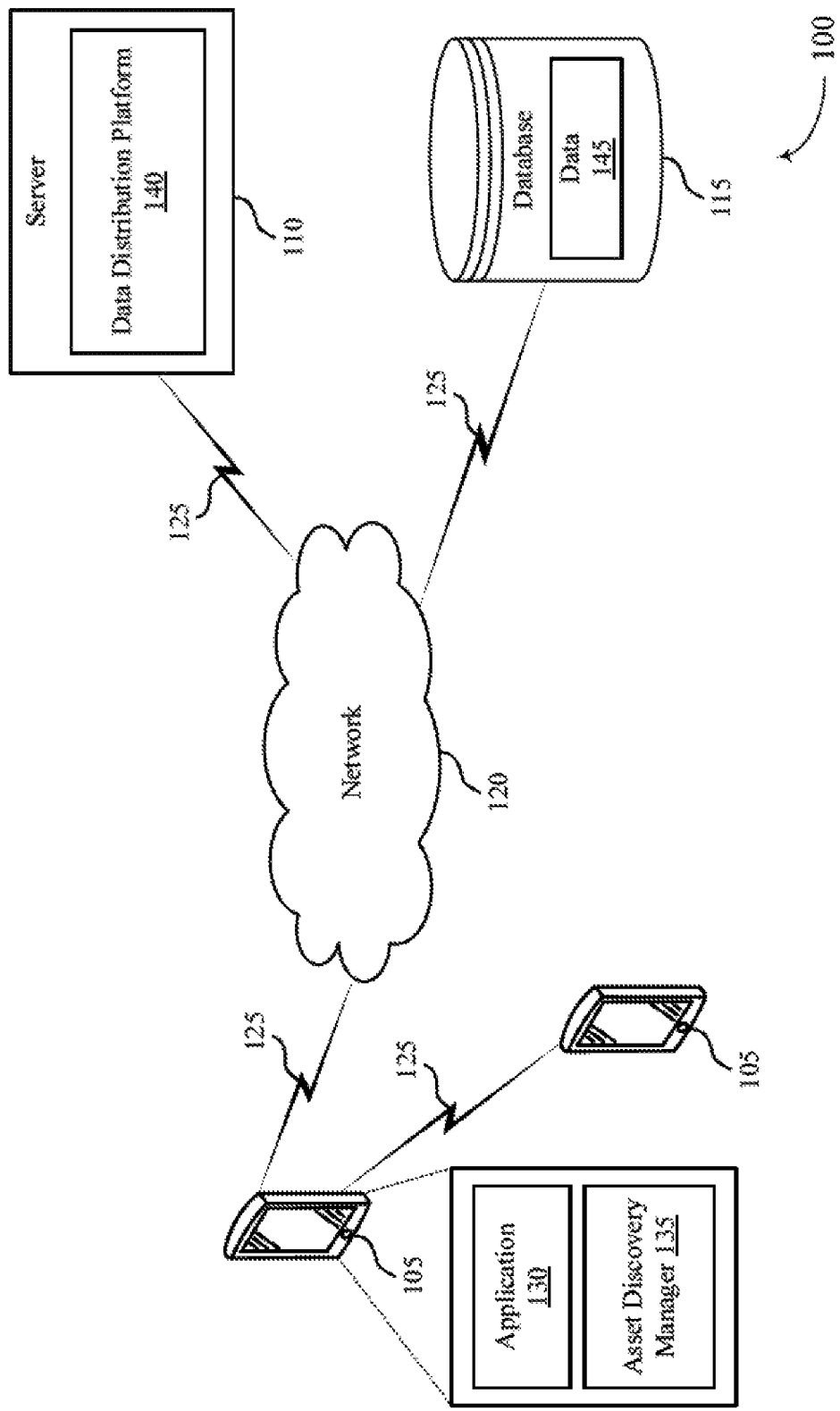
FIG. 1 illustrates an example of a system for asset discovery that supports asset discovery, user discovery, data classification, risk evaluation, and data/device security in accordance with aspects of the present disclosure.

Security and information technology (IT) management is based on a precisely and accurately-described asset inventory of known assets (e.g., based on a configuration management database (CMDB)). The larger an entity (e.g., enterprise, organization, company, school, etc.), the greater the awareness of the benefits of a CMDB. Some systems have been released attempting to address these issues, but some systems use a pre-registration of assets and a continual contact with a management host. These attempts at asset inventory or CMDB have failed owing to their critical dependency on manual creation and maintenance. Many significant breaches have been rooted in an inadequate CMDB. Audits or red team assessments often discover unknown and vulnerable systems, and blue teams can often waste time chasing down alerts arising from unregistered internet protocol (IP) addresses. These problems increase logarithmically with the proliferation of bring your own data (BYOD), shadow IT, individual software as a service (SaaS) accounts, and cloud computing.

Some entities presently share and compare departmental spreadsheets, manually maintain their SaaS service management's asset inventory, and struggle to correlate disparate information held by endpoint management, vulnerability tracking, and cloud access security broker gateways. However, entities cannot manage what they cannot see. Entities cannot secure what is invisible to them. The larger the company or entity, the greater the chance of their being unknown assets.

The described techniques provide a framework around discovery of user, asset, and data for entity asset management and risk evaluation. The described techniques include and implement advanced machine learning techniques to perform automatic data classification, finding the most probable data type related with each asset without any software agent or human manual inspection. The described techniques combine human reinforcement learning and machine accumulative learning to improve the accuracy of the user, asset, and data discovery.

The described techniques perform automated asset inventory collection and classification and deliver a robust, continually valid configuration management database that identifies both known and unknown assets, as well as unmanaged assets. The described techniques include using an entity's rudimentary and existing data then applying a unique set of machine learning and artificial intelligence operations to discover, classify, and risk rank known and previously unknown assets and data, as well as deducing, identifying, and risk ranking the users that are storing, transmitting, and processing restricted data on these systems. The present techniques reveal and risk rank shadow IT and cloud assets by the classification of their data and users.

The described techniques identify a user downloading contact lists from a customer relationship management (CRM) service, identify a finance user accessing source code as distinct from the finance cohort. The described techniques identify users conducting business on devices with corporate controls removed or simply brought from home. Based on the described techniques, compliance with general data protection regulation's (GDPR's) and California consumer privacy act's (CCPA's) "right to be forgotten" is a relatively simple procedure. Based on the described techniques, applications and systems, managed or not, report the presence or absence of a sought-for user's data. Without watermarks or latency inducing bottlenecks, the described techniques classify data by direct match and induction of the characteristics of not only the data, but also the assets and users involved. The described techniques identify the accidental move of a highly confidential file from controlled corporate cloud storage to personal cloud storage as one example. The described techniques also identify a purposeful renaming of an extract prior to exfiltration.

The present techniques include discovering known and unknown assets. In some examples, discovering known and unknown assets may include using a summarized netflow data, internet protocol (IP) assignment and allocation data, endpoint management and protection data, host and network intrusion detection and prevention data, and any other data available in information technology (IT), operational technology (OT), internet of things (IOT), industrial internet of things (IIOT) environments across wired or wireless networks to discover unknown devices (e.g., workstations, mobile devices, servers, virtual machines, storage devices, printers, data storage devices, network devices, media devices, cameras, etc.) and provide context for the discovered devices. The present techniques use the information of users associated of the device to add contextual information of the assets. The present techniques use the adjacency of some device connecting to an adjacent device to add contextual information of the assets and use network graph learning to infer contextual information for assets. The present techniques adopt human-input data into the data-discovery loop that allows human to input, augment, and/or correct machine-automatic inferences and incorporate the human-input data into a result output database of the present techniques. The present techniques include accumulative learning. The result output databases of the present techniques take updates at the field level of data. The present techniques generate confidence scores to indicate the accuracy of machine-learning inferences. The present techniques update the confidence scores for assets and risk scores as needed as the data is gathered and analyzed.

The present techniques use a user's organization group, role, and job title and user log on behavior to infer classification of data confidentiality for data associated with the user that resides on remote assets. The present techniques use file sharing data between different users or different assets, or both, and infer classification of data confidentiality for user/asset data that resides on the remote assets. The present techniques use the weighted graph model to infer data type to infer classification of data confidentiality for user/asset data that resides on the remote assets. The present techniques combine the above mentioned inference results use data minimums, data maximums, data medians, data most frequent values, percentage of missing values, percentage of distinct values, min-max range scaling, cumulative distribution function, logistic/sigmoid function, etc., to generate a final output of data classification.

Aspects of the disclosure are initially described in the context of a data system. Aspects of the disclosure are further illustrated by and described with reference to block diagrams, apparatus diagrams, system diagrams, and flowcharts that relate to asset discovery, user discovery, data classification, risk evaluation, and data/device security.

FIG. 1 illustrates a data system 100 for a device that supports asset discovery, user discovery, data classification, risk evaluation, and data/device security in accordance with aspects of the present disclosure. The data system 100 may include devices 105, a server 110, and a database 115. Although, the data system 100 illustrates two devices 105, a single server 110, a single database 115, and a single network 120, the present disclosure applies to any data system architecture having one or more devices 105, or one or more servers 110, or one or more databases 115, or one or more networks 120, or any combination thereof. The devices 105, the server 110, and the database 115 may communicate with each other and exchange information that supports asset discovery, user discovery, data classification, risk evaluation, and data/device security, such as data packets, data, or data control information, via network 120 using communications links 125. In some cases, a portion or all of the techniques described herein supporting asset discovery, user discovery, data classification, risk evaluation, and data/device security may be performed by the devices 105 or the server 110, or both.

A device 105 may be a cellular phone, a smartphone, a personal digital assistant (PDA), a wireless communication device, a handheld device, a tablet computer, a laptop computer, a personal computer, a cordless phone, a display device (e.g., monitors), and/or the like that supports various types of communication and functional features related to data (e.g., transmitting, receiving, broadcasting, streaming, sinking, capturing, storing, and recording data). A device 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the devices 105 may also be able to communicate directly with another device (e.g., using a peer-to-peer (P2P) or device-to-device (D2D) protocol). For example, a device 105 may be able to receive from or transmit to another device 105 a variety of information, such as instructions or commands (e.g., data-related information associated with asset discovery).

The devices 105 may include an application 130 and an asset discovery manager 135. In some cases, server 110, or database 115, or network 120 (e.g., a network device of network 120), or any combination thereof, may include application 130 or asset discovery manager 135, or both. While, the data system 100 illustrates the devices 105 including both the application 130 and the asset discovery manager 135, the application 130 or the asset discovery manager 135 may be an optional feature for the devices 105, or server 110, or database 115, or network 120. In some cases, the application 130 may be a data-based application that can receive data (e.g., downloaded, streamed, broadcasted) from the server 110, database 115 or another device 105, or transmit data (e.g., upload) to the server 110, the database 115, or to another device 105 via using communications links 125.

The asset discovery manager 135 may use, be a part of, or include a processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof, or other programmable logic device, discrete gate or transistor logic, discrete hardware components, or any combination thereof designed to perform the functions described in the present disclosure, and/or the like. For example, the asset discovery manager 135 may process and identify data (e.g., enterprise data, local data, remote data, cloud data, etc.) from and/or write data to a local memory of the device 105, or to server 110, or to the database 115, or any combination thereof.

The asset discovery manager 135 may also be configured to provide data analysis, data classification, data compression, data streaming, data synthesis, data risk ranking, and data protection among other functionality. By further example, the asset discovery manager 135 may process data to support asset discovery, user discovery, data classification, risk evaluation, and data/device security, according to the techniques described herein.

The server 110 may be a data server, a cloud server, a server associated with an data subscription provider, proxy server, web server, application server, communications server, home server, mobile server, or any combination thereof. The server 110 may in some cases include a data distribution platform 140. The data distribution platform 140 may allow the devices 105 to discover, browse, share, and download data (e.g., data 145) via network 120 using communications links 125, and therefore provide a digital distribution of the data from the data distribution platform 140. As such, a digital distribution may be a form of delivering media content such as audio, video, images, without the use of physical media but over online delivery mediums, such as the Internet. For example, the devices 105 may upload or download data-related applications for streaming, downloading, uploading, processing, discovering, classifying, protecting, etc. data (e.g., enterprise data, local data, remote data, cloud data, etc.). The server 110 may also transmit to the devices 105 a variety of information, such as instructions or commands (e.g., data-related information) to download data-related applications on the device 105.

The database 115 may store a variety of information, such as instructions or commands (e.g., data-related information). For example, the database 115 may store data 145. The device may support asset discovery, user discovery, data classification, risk evaluation, and data/device security associated with the data 145. The device 105 may retrieve data from the server 110, or the database 115, or the network 120 (e.g., from a network device of network 120), or any combination thereof, via network 120 using communication links 125. In some examples, the database 115 may be a relational database (e.g., a relational database management system (RDBMS) or a Structured Query Language (SQL) database), a non-relational database, a network database, an object-oriented database, or other type of database, that stores the variety of information, such as instructions or commands (e.g., data-related information).

The network 120 may include one or more network devices (e.g., gateway, router, switch, network hub, wireless router, wireless access point, firewall, intrusion detection system, etc.). The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 120 may include the Internet.

The communications links 125 shown in the data system 100 may include uplink transmissions from the device 105 to the server 110 and the database 115, and/or downlink transmissions, from the server 110 and the database 115 to the device 105. The wireless links 125 may transmit bidirectional communications and/or unidirectional communications. In some examples, the communication links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

The described techniques include asset discovery manager 135 retrieving data stored at one or more remote locations, summarizing the retrieved data at the one or more remote locations, and transferring the summarized data from the one or more remote locations to one or more computing devices. The described techniques include asset discovery manager 135 processing the transferred data and discovering, based on the processing of the transferred data, assets in information technology environments, or in operational technology environments, or in internet-of-things technology environments, or in any combination thereof, that are operating in wired networks or wireless networks, or operating in both. In some cases, the asset discovery manager 135 discovering the assets includes the asset discovery manager 135 discovering known assets and unknown assets. The described techniques include asset discovery manager 135 classifying, based on the processing of the transferred data, data that resides on each asset of the discovered assets into a respective confidentiality group of multiple confidentiality groups and calculating, based on the processing of the transferred data, one or more risk scores for the discovered assets or users of the discovered assets, or both. The described techniques include asset discovery manager 135 performing a security action to protect data that resides on an asset of the discovered assets based at least in part on a confidentiality group to which the data on the asset is classified and a calculated risk score of the asset or a calculated risk score of a user of the asset, or both.

The techniques described herein provide improvements in asset discovery, user discovery, data classification, risk evaluation, and data protection. The described techniques enable an entity to discover, classify, and risk rank known and previously unknown assets and data, as well as deducing, identifying, and risk ranking the users that are storing, transmitting, and processing restricted data on these systems. The described techniques enable an entity to choose to control or exclude the unmanaged asset from their network and data. Based on the described techniques red team reports will no longer list unidentified systems containing critical vulnerabilities and cyber-incident response team will no longer have blind spots in their detection, monitoring, and handling of incidents. The described techniques enable an entity to learn of the existence and configuration of previously unknown assets (on premises, in the cloud, etc.) with which their data are stored, transmitted, and processed. The described techniques highlight the degree of adequacy of an entity's security tools and vulnerability scans. The risk of an asset is demonstrated by both the classification of data present of the described techniques and by user and asset adjacency to areas of known risk or certification requirements determined by the described techniques.

Figure 2:
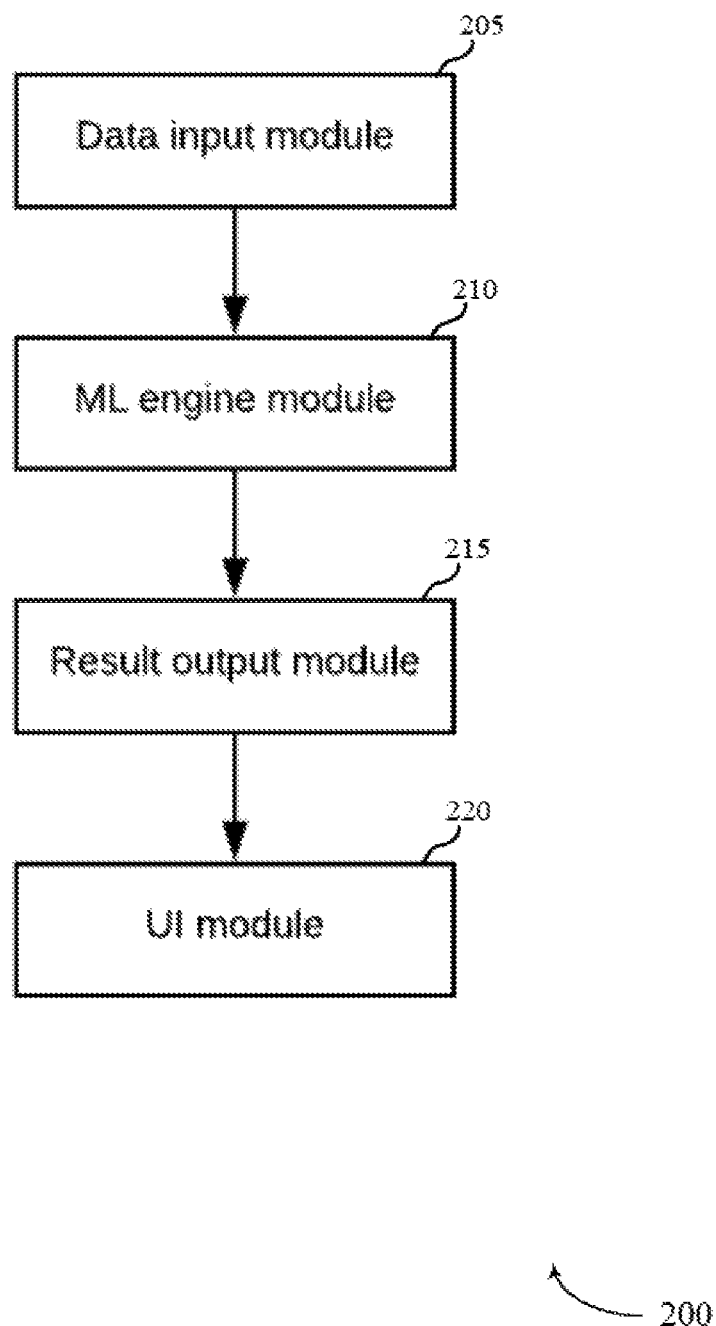
FIG. 2 illustrates an example of a block diagram that supports asset discovery, user discovery, data classification, risk evaluation, and data/device security in accordance with aspects of the present disclosure.

FIG. 2 illustrates an example of a block diagram 200 that supports asset discovery, user discovery, data classification, risk evaluation, and data/device security in accordance with aspects of the present disclosure. In some examples, block diagram 200 may implement aspects of wireless communication system 100. As illustrated, the block diagram 200 may include data input module 205, machine learning (ML) engine module 210, result output module 215, and user interface (UI) module 220.

In some examples, data input module 205 may retrieve data stored at one or more remote locations, summarize the retrieved data at the one or more remote locations, and transfer the summarized data from the one or more remote locations to a computing device (e.g., device 105, or server 110, or database 115, or a network device of network 120, or any combination thereof). The described techniques include ML engine module 210 processing the transferred data and discovering, based on the processing of the transferred data, assets in one or more environments (e.g., information technology environments, or in operational technology environments, or in internet-of-things technology environments, or in any combination thereof). In some cases, the one or more environments operate in wired networks or wireless networks, or operate in some combination thereof. In some cases, discovering the assets includes discovering known assets and unknown assets. In some examples, ML engine module 210 may classify, based on the processing of the transferred data, data that resides on each asset of the discovered assets into a respective confidentiality group of multiple confidentiality groups. In some examples, result output module 215 may calculate, based on the processing of the transferred data, one or more risk scores for the discovered assets or users of the discovered assets, or both. In some examples, result output module 215 or UI module 220, or some combination thereof, may perform a security action to protect data that resides on an asset of the discovered assets based at least in part on a confidentiality group to which the data on the asset is classified and a calculated risk score of the asset or a calculated risk score of a user of the asset, or both.

Figure 3:
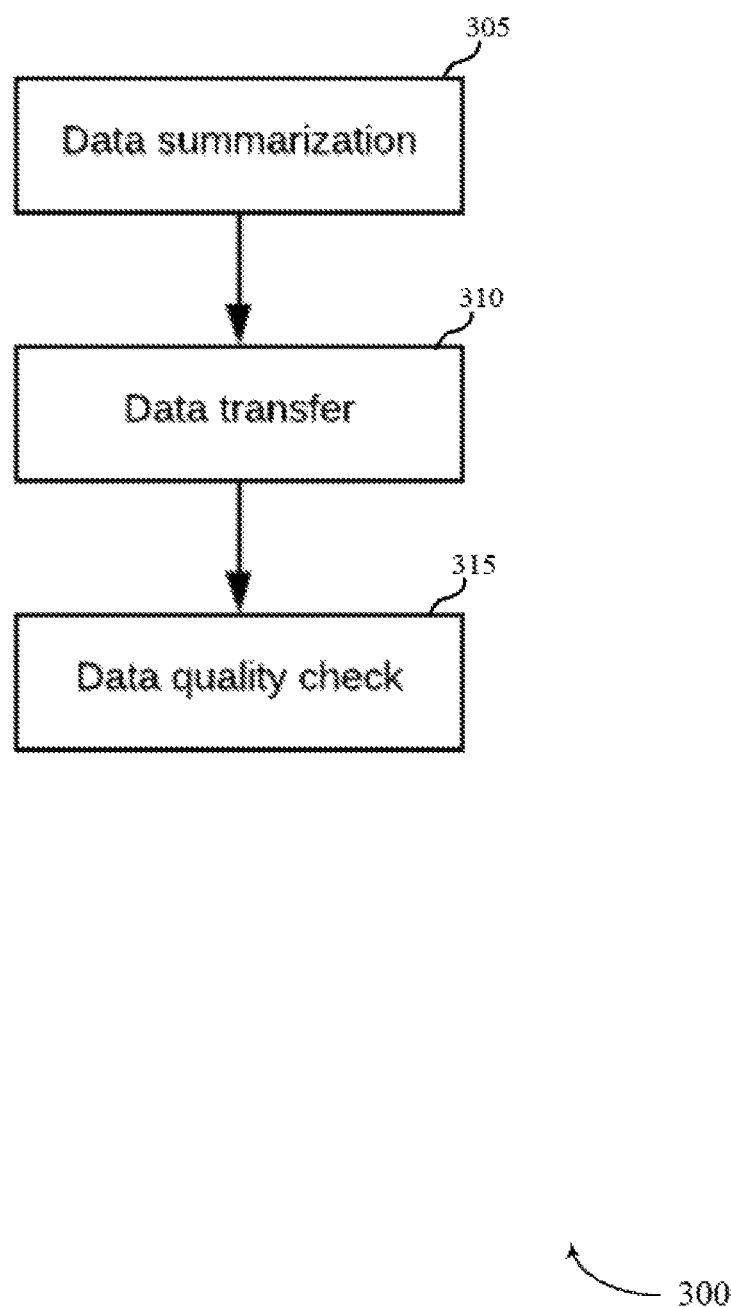
FIG. 3 illustrates an example of a block diagram that supports asset discovery, user discovery, data classification, risk evaluation, and data/device security in accordance with aspects of the present disclosure.

FIG. 3 illustrates an example of a block diagram 300 that supports asset discovery, user discovery, data classification, risk evaluation, and data/device security in accordance with aspects of the present disclosure. In some examples, block diagram 300 may implement aspects of wireless communication system 100. In some examples, block diagram 300 may include aspects of data input module 205. In the illustrated example, block diagram 300 may include data summarization 305, data transfer 310, and data quality check 315. In some examples, block diagram 300 may include components and/or operations associated with data input module 205 that include data summarization 305, operations associated with data transfer 310, and operations associated with data quality check 315. In some examples, block diagram 300 may be configured to query data in a remote location (e.g., data in a digital data warehouse, data associated with a data warehousing application, data associated with a structured query language (SQL) server, data associated with a cloud data platform services, data associated with a cloud data applications, data associated with a cloud database, data associated with a data indexing application, data associated with a data search engine, etc.) and inject the data (e.g., summarized/reduced data) into a managed computing device (e.g., device 105, or server 110, or database 115, or a network device of network 120, or any combination thereof).

In some examples, data summarization 305 includes retrieving data stored at one or more remote locations (e.g., server 110, or database 115, or a network device of network 120, or any combination thereof), and summarizing the retrieved data at the one or more remote locations. In some examples, data summarization 305 includes a device (e.g., device 105) connecting to a remote data warehouse (e.g., server 110, or database 115, or a network device of network 120, or any combination thereof) and collecting data from the remote data warehouse for analysis. Table 1 below provides examples of different types of data being collected and examples of each different type of data.

TABLE 1

| Types of Data | Examples |
| --- | --- |
| User Information | Active Directory, Workday, Bamboo |
| Asset Information | Amazon Web Services (AWS) Inventory, Endpoint Agent Logs |
| System Security | Windows Event—Security, Linux Secure |
| DHCP/IP Management | Infoblox, Dynamic Host Configuration Protocol (DHCP) Server Log |
| File Access | Box, Google Drive, Dropbox |
| Network Flow | AWS virtual private cloud (VPC) Flow, Palo Alto networks (PAN) Firewall Log |
| IT Asset List | Managed Asset List, PCI database, health insurance portability and accountability database, Source Code Server List |
| Endpoint Protection | SentinelOne, SEP |
| Vulnerability Scan | Tenable, Qualys |

In some examples, data summarization 305 may include a device (e.g., device 105) summarizing (e.g., reducing) the amount and/or size of data retrieved from the remote location (e.g., remote data warehouse) before data injection, in order to minimize the amount of data and/or minimize the size of data being transferred when transferring the summarized data (data remaining after reducing the size of data) in order to store and/or process the summarized on a local device (e.g., device 105).

In some examples, data summarization 305 may include collecting summarized data without raw data from the remote data warehouse. In some examples, data summarization 305 may include aggregating data traffic by the hour and transferring the aggregated data, or collecting and transferring a source IP associated with the data traffic, or collecting and transferring destination IP associated with the data traffic, or any combination thereof, but not collecting or transferring the data traffic itself. In some examples, data summarization 305 may include identifying metadata and/or one or more data fields associated with the data traffic or full dataset, extracting the data from the metadata and/or the one or more identified data fields and transferring the extracted data to the local device. In some examples, data summarization 305 may include identifying detailed cloud data storage file access activities, but extracting (e.g., extracting only) a user name and one or more file names associated with the file access activities (e.g., collect and transfer the user name and file names, but not the actual files).

In some examples, data summarization 305 may include analyzing raw data stored in a remote location (e.g., remote data warehouse). In some cases, the data may be stored on a human resource management server, or an endpoint management server, or an IP assignment server, or any combination thereof. In some cases, the remote data may be aggregated in a security information and event management system data summarization 305 may include analyzing the aggregated data from the security information and event management system.

In some examples, data summarization 305 may include identifying one or more data fields from a predetermined list of preferred data fields in the raw data. In some examples, data summarization 305 may include running group-by functions by IP address, etc., on the raw data. In some example, data summarization 305 may include selecting one or more columns from a table of a SQL database (e.g., using a SQL select statement). In some examples, data summarization 305 may include filtering records from the table (e.g., using a SQL where statement). In some examples, data summarization 305 may include summarizing the table (e.g., using a SQL group by statement). In some examples, data summarization 305 may include retrieving values in those columns or data fields and collecting the values from the fields from at least one remote location (e.g., from at least one remote server such as server 110, or from at least one remote database such as database 115, or from both). In some examples, the processed table may be transferred to a local computing device (e.g., device 105).

In some examples, data summarization 305 may include summarization and filtering for different data sources. In some examples, data summarization 305 may include applying summarization to a first remote data source, filtering to a second remote data source, both summarization and filtering to a third remote data source, and no summarization and no filtering to a fourth remote data source.

In some examples, data transfer 310 may include transferring the summarized data from the one or more remote locations (e.g., remote data warehouse) to the at least one computing device (e.g., device 105). In some examples, the transferred data may be processed by the at least one computing device (e.g., data analysis, machine learning, calculating risk scores, etc.). In some cases, one or more assets may be discovered based on the processing of the transferred data.

In some examples, data quality check 315 may include verifying a quality of the collected data or transferred data and determining if the collected data or transferred data is complete with correct formats and of a predetermined quality. In some examples, data quality check 315 may include determining statistics on data fields that indicate formats and/or quality (e.g., data minimums, data maximums, data medians, data most frequent values, percentage of missing values, percentage of distinct values, etc.). In some examples, data quality check 315 may include comparing the collected data or transferred data with raw data at the remote location (e.g., remote data warehouse) such as determining a difference, if any, in distinct numbers of users and/or assets, etc. In some examples, data quality check 315 may include determining and/or analyzing one or more metrics to determine whether the collected data or transferred data meets a predetermined constraint (e.g., a percent of missing values in the collected data or transferred data for a collected data field is less than 10% compared to raw data or compared to an expected value, or is less than or equal to 10% compared to raw data or compared to an expected value, etc.).

In some examples, data quality check 315 may include verifying that a data quality of the retrieved data satisfies a quality threshold. In some examples, data quality check 315 may include determining one or more statistics of the data and determining the one or more statistics satisfy a statistics threshold. In some cases, the one or more statistics of the data may include a degree of variation between a value associated with the data and an expected value, or a variation between a number of values determined to be associated with the data and a number of values expected to be associated with the data, or a variation between a number of users determined to be associated with the data and a number of users expected to be associated with the data, or a variation between a number of assets determined to be associated with the data and a number of assets expected to be associated with the data, or a degree of variation between a calculated median of a plurality of values associated with the data and an expected median, or a degree of variation between a calculated minimum of the plurality of values associated with the data and an expected minimum, or a degree of variation between a calculated maximum of the plurality of values associated with the data and an expected maximum, or a percentage based on a number of the plurality of values that vary from respective expected values and a number of the plurality of values that do not vary from the respective expected values, or any combination thereof.

Figure 4:
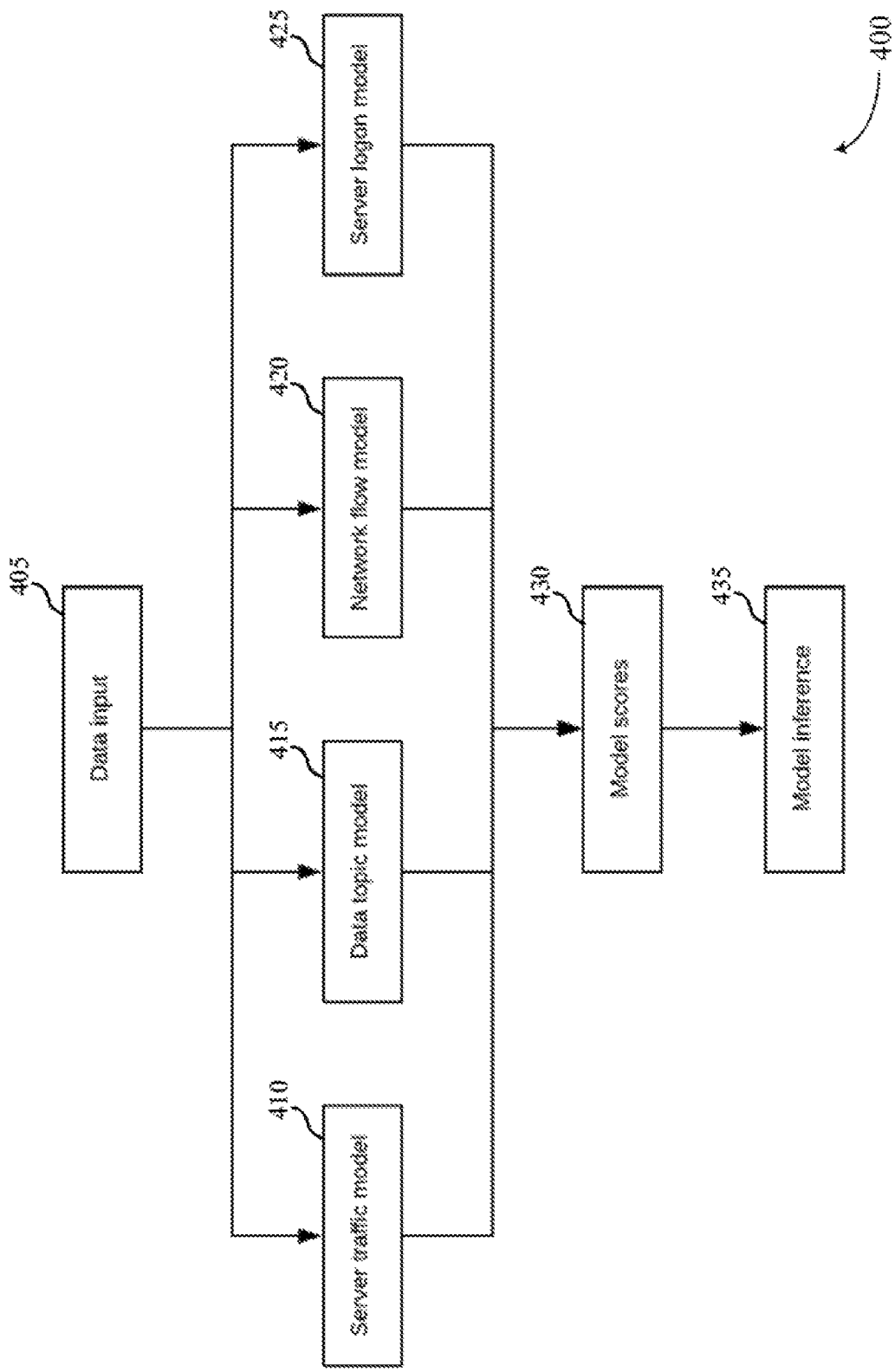
FIG. 4 illustrates an example of a block diagram that supports asset discovery, user discovery, data classification, risk evaluation, and data/device security in accordance with aspects of the present disclosure.

FIG. 4 illustrates an example of a block diagram 400 that supports asset discovery, user discovery, data classification, risk evaluation, and data/device security in accordance with aspects of the present disclosure. In some examples, block diagram 400 may implement aspects of wireless communication system 100. In some examples, block diagram 400 may include aspects of ML engine module 210. In the illustrated example, block diagram 400 may include data input 405, server traffic model 410, data topic model 415, network flow model 420, server logon model 425, model scores 430, and model inference 435. In some examples, block diagram 400 may include components and/or operations associated with ML engine module 210 that include data input 405, server traffic model 410, data topic model 415, network flow model 420, server logon model 425, model scores 430, and model inference 435.

In some examples, data input 405 may access data in an enterprise file sharing log. In some examples, data topic model 415 may group the data by user name and file name. In some cases, data topic model 415 may concatenate all file names into one file name string by user. In some cases, data topic model 415 may clean file name string (removing stop words and file name extensions). In some cases, data topic model 415 may tokenize the file name string and create a bag-of-words input for a text mining model. In some cases, data topic model 415 may train topic modeling on the bag-of-words. In some cases, the topic model may include, but is not limited to, Latent Dirichlet Allocation (LDA), or Latent Semantic Analysis (LSA), or Probabilistic Latent Semantic Analysis (pSLA), or Deep Learning (such as lda2vec), or Non-negative Matrix Factorization (NMF), or any combination thereof. In some cases, data topic model 415 may apply topic model to file names and assign them to different text clusters. In some cases, model scores 430 may generate one or more scores for the analyzed data associated with data topic model 415. In some cases, model inference 435 may make one or more inferences based on the text clusters, or scores, or retrieved data, or analysis of the retrieved data, or any combination thereof. In some cases, for each text cluster model inference 435 may select a most frequent keyword as a data topic and output the user name, text cluster, and selected data topic.

In some examples, the data retrieved by data input 405 may include the-first-file.doc and a-second-file.exe. Both the-first-file.doc and a-second-file.exe may be associated with user John Doe. In some cases, data topic model 415 may concatenate file names associated with the John Doe into a single file name "the-first-JohnDoe.doc a-second-JohnDoe.exe." In some cases, data topic model 415 may clean the file name string by removing stop words (e.g., removing frequently used words such as "the," "is," "and," "a," "an," "he," "she," etc.). In some cases, data topic model 415 may clean the file name string by removing file name extensions (e.g., .exe, .doc, .app, etc.). The cleaning of the file name string by data topic model 415 may result in the file name string "first-JohnDoe second-JohnDoe." In some cases, data topic model 415 may tokenize the file name string and create a bag-of-words input for a text mining model. In some cases, the tokenization may include breaking the file name string into separate words. After tokenization the file name string may be "first JohnDoe second JohnDoe." In some cases, data topic model 415 may create the bag-of-words as {"first": 1; "second": 1; "JohnDoe": 2}, where the number represents the number of instances of a particular words after tokenization. In some cases, data topic model 415 may feed these words and values from the bag-of-words into a text mining training algorithm.

In some examples, data input 405 may access data in an enterprise server list (e.g., PCI server IP addresses, etc.). In some cases, data input 405 may retrieve network flow logs related to a list of predetermined servers. In some cases, data input 405 may group the network flow logs by internal source IP and destination IP. In some cases, network flow model 420 may specify apply an edge weight variable (e.g., number of packets/bytes transferred between source and destination IP). In some cases, a default weight may be 1. In some cases, network flow model 420 may perform a weighted graph model. The graph model may include, but is not limited to, connected components, PageRank, triangle count, graph centrality (e.g., degree centrality, closeness centrality, etc.), output IP, a model score of the output IP.

In some cases, model scores 430 may generate one or more scores for the analyzed data associated with network flow model 420. In some cases, model inference 435 may make one or more inferences based on the scores, or retrieved data, or analysis of the retrieved data, or any combination thereof. In some cases, model inference 435 may select the IP's with the highest model score and infer their data type and data classification. In some examples, for PCI traffic model inference 435 may set the data type as PCI and data classification as highly confidential.

In some examples, data input 405 may retrieve server user logon data. In some examples, data input 405 may retrieve human resource data. In some examples, server logon model 425 may group the server user logon data or human resource data, or both, by server name and user name. In some cases, server logon model 425 may attach a user's business department (e.g., marketing, engineering, programming, etc.) based on human resource data retrieved by data input 405. In some examples, for each server logon model 425 may calculate total user count (TC) and user count by business department (UC). In some examples, for each server logon model 425 may calculate department user ratio as UC/TC. In some examples, for each server logon model 425 may determine the business department with the highest user ratio (e.g., marketing includes 15% of total users, engineering includes 30% of total users, and programming includes 40% of total users, and staff includes 15% of total users, so programming has the highest user ratio). In some cases, model scores 430 may generate one or more scores for the analyzed data associated with server logon model 425. In some cases, model inference 435 may make one or more inferences based on the scores, or retrieved data, or analysis of the retrieved data, or any combination thereof.

In some examples, when the highest user ratio is over a determined threshold, then model interference 435 may use department information to infer a server's data type/classification. In some examples, when over 50% of the users on this server come from HR department (e.g., the highest user ratio), then model interference 435 may assign the server's data type as HR and data classification as Private. In some cases, model inference 435 may apply a data type to the server based at least in part on the highest represented organization department. In some examples, the data type applied to the server may be the organization department that determined to be the highest represented organization department. In some cases, a server may be associated with users of an engineering department of an organization and with users of a marketing department of the organization. Analysis of the retrieved data may indicate that 77% of the users associated with the server are from the engineering department while only 10% of the users associated with the server are from the marketing department. Accordingly, the data type applied to the server may be an engineering data type (e.g., server data type: engineering) based on 77% of the users associated with the server being from the engineering department.

In some examples, data input 405 may retrieve internal network traffic from a server (e.g., Workday server with human resource data). In some examples, data topic model 415 may group the internal network traffic by source IP and destination IP. In some examples, server traffic model 410 may apply a source IP address to host mapping to attach a host name to the source IP. In some examples, server traffic model 410 may apply a destination IP address to host mapping to attach a host name to the destination IP. In some examples, a host may be a computing device (e.g., laptop, workstation, or server) and the computing device (host) may be mapped to a source IP address or destination IP address. In some examples, server traffic model 410 may apply a host to a user mapping to attach a user name to the host. In some examples, server traffic model 410 may further link the host to a user in addition to mapping the host to the IP address. In some examples, server traffic model 410 may select top N hosts with highest traffic to the server (e.g., highest number of packets/bytes). In some cases, model scores 430 may generate one or more scores for the analyzed data associated with server traffic model 410. In some cases, model inference 435 may make one or more inferences based on the scores, or retrieved data, or analysis of the retrieved data, or any combination thereof. In some cases, server traffic model 410 may assign a host/user's data classification according to the server type. In some examples, for a Workday server type model inference 435 may set the host/user's data type as human resources and data classification as Private.

Figure 5:
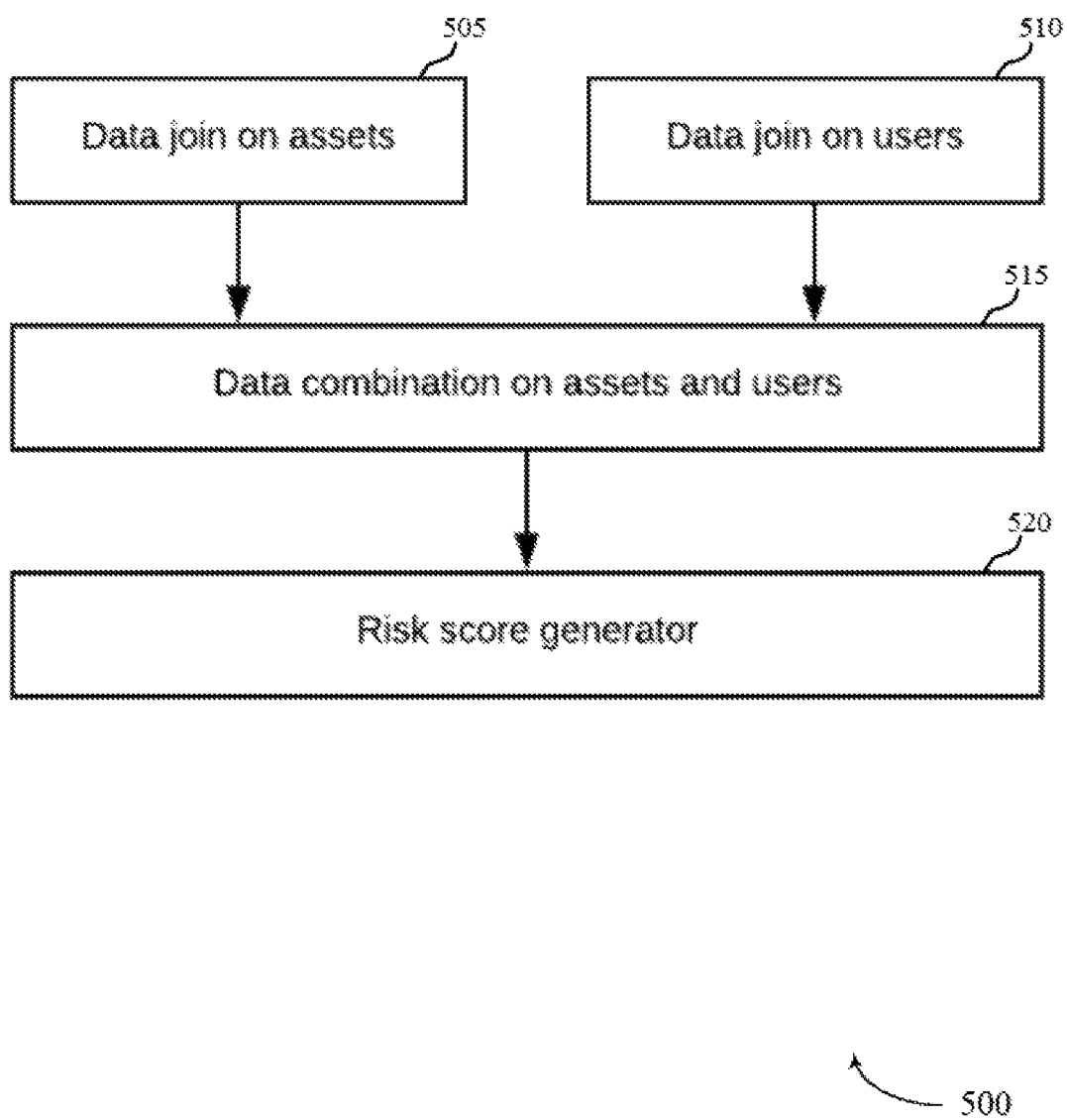
FIG. 5 illustrates an example of a block diagram that supports asset discovery, user discovery, data classification, risk evaluation, and data/device security in accordance with aspects of the present disclosure.

FIG. 5 illustrates an example of a block diagram 500 that supports asset discovery, user discovery, data classification, risk evaluation, and data/device security in accordance with aspects of the present disclosure. In some examples, block diagram 500 may implement aspects of wireless communication system 100. In some examples, block diagram 500 may include aspects of result output module 215. In the illustrated example, block diagram 500 may include data join on assets 505, data join on users 510, data combination on assets and users 515, and risk score generator 520. In some examples, block diagram 500 may include components and/or operations associated with result output module 215 that include data summarization data join on assets 505, data join on users 510, data combination on assets and users 515, and risk score generator 520. In some examples, block diagram 500 may be configured to merge data to generate final outputs and asset/user risk scores.

In some examples, data join on assets 505 may join datasets that are associated with a given asset by asset name or asset IP address, or both. In some cases, the datasets that are associated with a given asset may include, but are not limited to, at least one of network flow model outputs, server logon model outputs, server traffic model outputs, AWS data, vulnerability scanning data (e.g., risk management data, cloud security data, security compliance data, etc.), endpoint protection data (e.g., endpoint protection data, autonomous endpoint security data), IP management data (e.g., IT automation data, IT security data, DHCP logs, etc.), or any combination thereof.

In some examples, data join on users 510 may join datasets that are associated with a given user by user name or user email, or both. In some cases, the datasets that are associated with a given user may include, but are not limited to, at least one of human resource data, identity management data (e.g., user authentication data, secure identity management data, etc.), active directory data, data topic model outputs, or any combination thereof.

In some examples, data combination on assets and users 515 may combine the asset datasets joined by data join on assets 505 and user datasets joined by data join on users 510. Some details of data combination on assets and users 515 are described in FIG. 6.

In some examples, risk score generator 520 may calculate risk scores of assets. In some cases, the risk scores risk score generator 520 may use rule-based algorithms or machine learning algorithms, or both, to calculate the risk scores. An example of a rule-based algorithm may include Risk Score for Asset i=Sum (Intercept+Weight*Variable)*Asset Data Risk.

Data classifications for datasets associated with a given user and/or datasets associated with a given asset may include Public/Unknown, Private/Restricted, Confidential, and Highly Confidential. In some examples, risk score generator 520 may assign a data risk (e.g., Asset Data Risk) to each data classification. In some cases, risk score generator 520 may assign Public/Unknown a data risk of 1.0, Private/Restricted a data risk of 2.0, Confidential a data risk of 3.0, and Highly Confidential a data risk of 4.0.

In some examples, a payment card industry (PCI) asset (e.g., PCI server) may be configured without endpoint protection and vulnerability scanning. In some cases, risk score generator 520 may assign an Intercept condition of the PCI asset a weight of 1.0, assign an Endpoint Protection NOT installed condition a weight of 3.0, assign an Endpoint Protection installed but NOT updated condition a weight of 1.25, assign a Vulnerability NOT scanned condition a weight of 1.25, and determine a Data Risk for the PCI asset to be 4.0 based on data associated with the PCI asset including highly confidential data. Based on these values, risk score generator 520 may calculate a risk score for the PCI asset as Risk Score=(1.0+3.0+1.25)*4.0=21.

In some examples, risk score generator 520 may scale the calculated Risk Score between a determined range (e.g., between 1 and 100). In some cases, risk score generator 520 may scale the calculated Risk Score based at least in part on Min-Max range scaling, or Cumulative distribution function, or Logistic/Sigmoid function, or any combination thereof.

Figure 6:
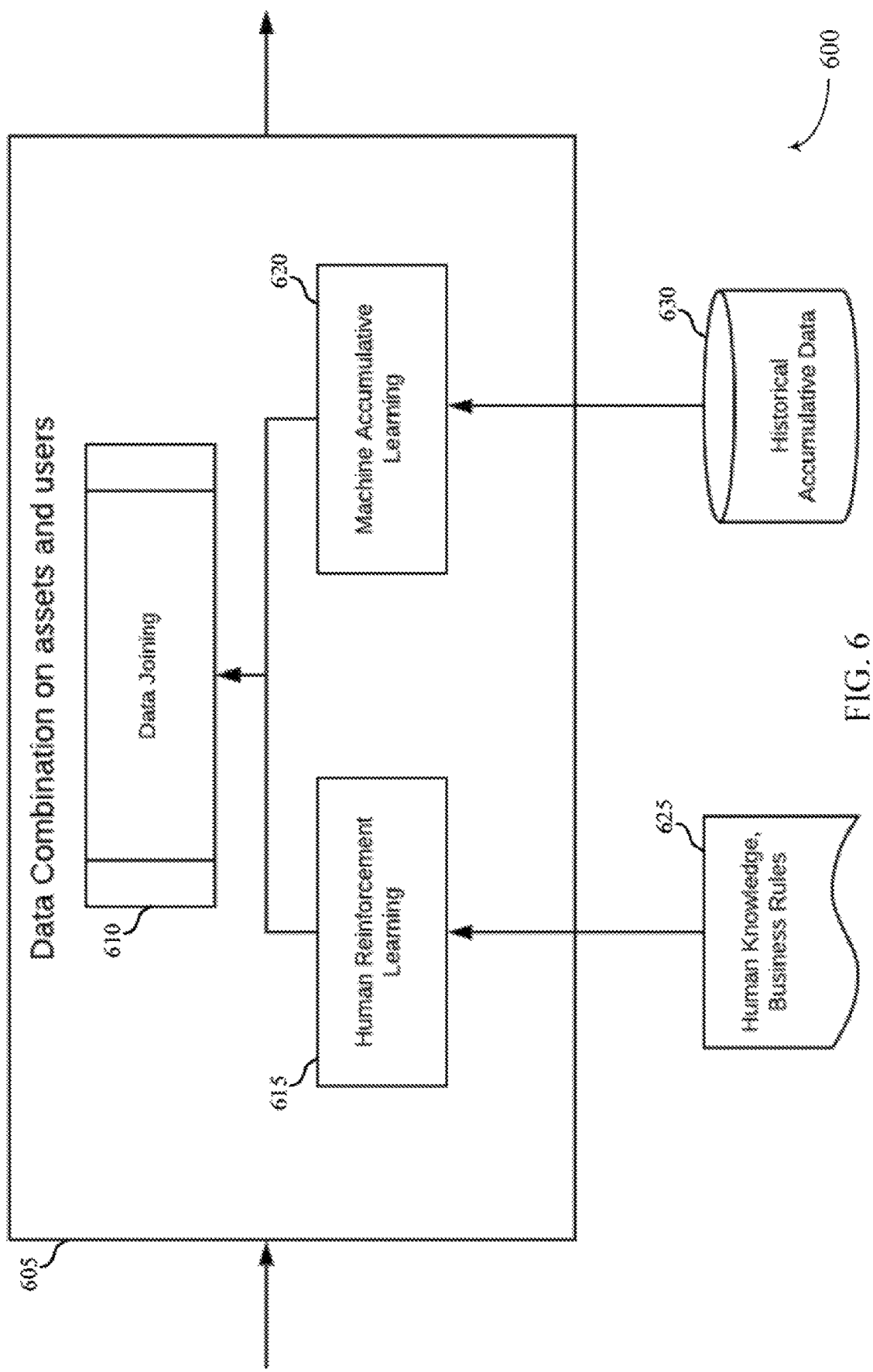
FIG. 6 illustrates an example of a block diagram that supports asset discovery, user discovery, data classification, risk evaluation, and data/device security in accordance with aspects of the present disclosure.

FIG. 6 illustrates an example of a block diagram 600 that supports asset discovery, user discovery data classification, risk evaluation, and data/device security in accordance with aspects of the present disclosure. In some examples, block diagram 600 may implement aspects of wireless communication system 100. In some examples, block diagram 600 may include aspects of result output module 215. In the illustrated example, block diagram 600 may include data combination on assets and users 605. The data combination on assets and users 605 may be an example of data combination on assets and users 515. As shown, data combination on assets and users 605 may include data joining 610, human reinforcement learning 615, machine accumulative learning 620, human knowledge, business rules 625, and historical accumulative data 630. In some examples, block diagram 600 may include components and/or operations associated with result output module 215 that include data combination on assets and users 605, data joining 610, human reinforcement learning 615, machine accumulative learning 620, human knowledge, business rules 625, and historical accumulative data 630. Data joining 610 may be an example of data join on assets 505, or data join on users 510, or data combination on assets and users 515, or any combination thereof. In some examples, block diagram 600 may be configured to integrate human reinforcement learning and machine accumulative learning to increase an accuracy of asset outputs or user outputs, or both. In some examples, data combination on assets and users 605 incorporates the latest information to update the user information or asset information, or both, to make sure the combined information is more accurate and more up to date.

In some examples, data joining 610 may join data from human reinforcement learning 615 with data from machine accumulative learning 620. In some examples, human reinforcement learning 615 may incorporate human knowledge (e.g., knowledge supplied or entered by a human) and/or business rules (e.g., human knowledge, business rules 625) to enrich user information and/or asset information. In some examples, a business rule (e.g., of human knowledge, business rules 625) may include "if the asset's IP address is within the range of 172.22.0.0/16, then this asset is a management server located in Canada." In some examples, human reinforcement learning 615 may extract this data (e.g., human knowledge, business rules 625) into a text structure such as {"IP_Range": "172.22.0.0/16", "Purpose": "Management Server", "Location": "Canada"}. In some examples, human reinforcement learning 615 may attach the text structure (e.g., data from human reinforcement learning 615) to all IP addresses within the specified range.

In some examples, machine accumulative learning 620 may collect historical accumulative data 630 (e.g., data from a specified time period such as data from a previous 7 days, etc.) from one or more data sources (e.g., server traffic data, data topic data, network flow data, server logon data, etc.). In some examples, machine accumulative learning 620 may analyze the collected historical accumulative data 630. In some cases, machine accumulative learning 620 may identify fields in the data (e.g., historical accumulative data 630) and determine the value in those identified fields. In some examples, machine accumulative learning 620 may identify a field "IT_Managed_Asset" from the collected historical accumulative data 630. In some cases, machine accumulative learning 620 may analyze the field over the specified time period and determine that on May 11, 2020, the associated data system set the value for "IT_Managed_Asset" of this asset as null from Palo Alto Firewall data; that on May 16, 2020, the data system detected that Just Another Management Framework (JAMF) data had the same field with the value "false;" and that on May 18, 2020, endpoint protection data had the value "true" for this field. Accordingly, data from machine accumulative learning 620 may include the "IT_Managed_Asset" field for Palo Alto Firewall data is null, that the "IT_Managed_Asset" field for JAMF data is false, and that the "IT_Managed_Asset" field for endpoint protection data is true.

Figure 7:
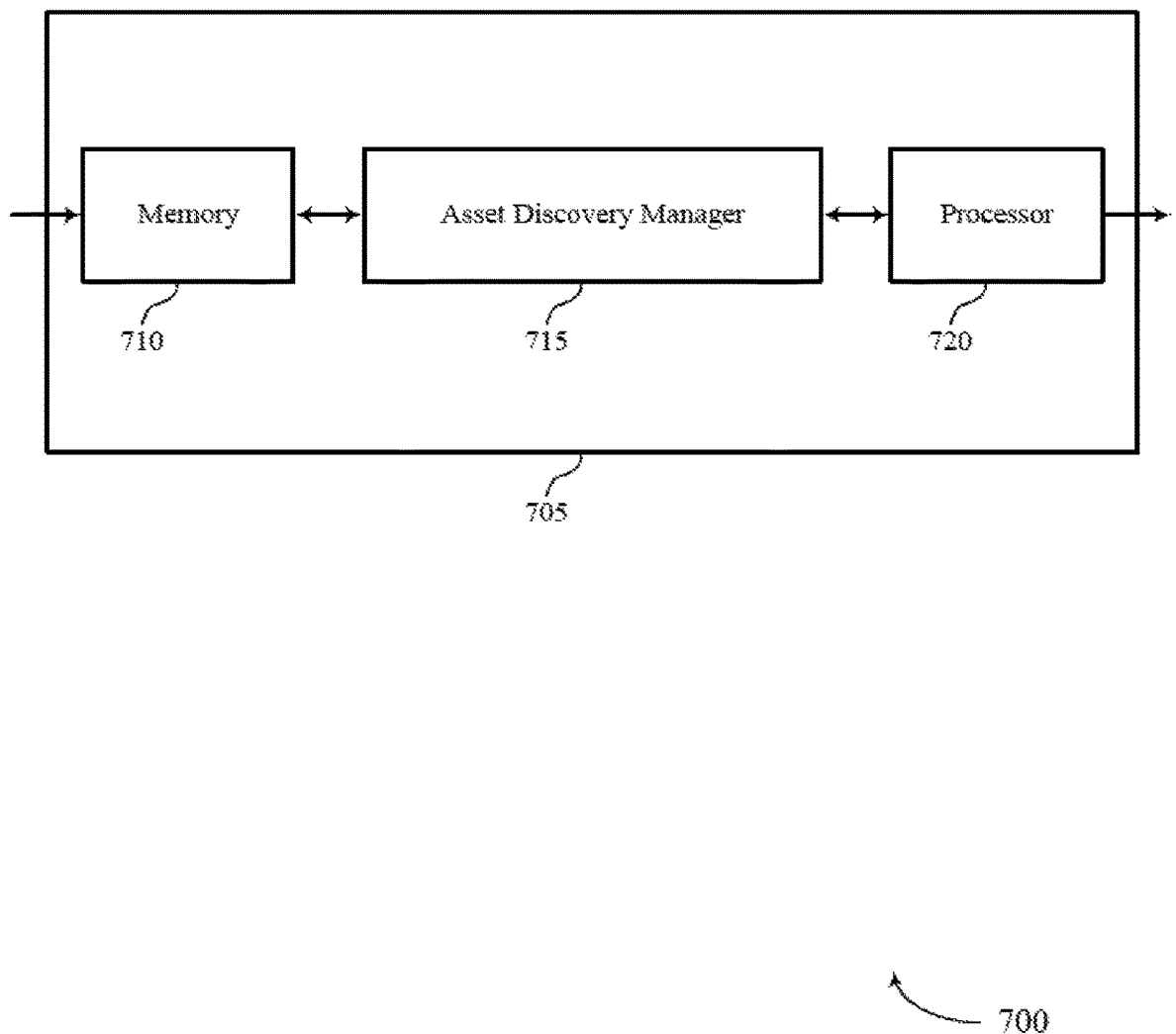
FIGS. 7 and 8 show block diagrams of devices that support asset discovery, user discovery, data classification, risk evaluation, and data/device security in accordance with aspects of the present disclosure.

FIG. 7 shows a block diagram 700 of a device 705 that supports asset discovery, data classification, user discovery, risk evaluation, and data/device security in accordance with aspects of the present disclosure. The device 705 may be an example of aspects of a device 105, or a server 110, or a database 115, or a network device of network 120, or a device 705, or any combination thereof, as described herein. The device 705 may include a memory 710, an asset discovery manager 715, and a processor 720. The device 705 may also include a processor. Each of these components may be in communication with one another (e.g., via one or more buses). The asset discovery manager 715 may be an example of aspects of the asset discovery manager 135 as described herein.

The memory 710 may store information (e.g., analysis data, classification data, metadata) generated by other components of device 705 such as asset discovery manager 715. For example, memory 710 may store one or more samples of data asset discovery manager 715 compares with an output of asset discovery manager 715. In some examples, the memory 710 may be collocated with one or more processors in a computing device (e.g., device 705). For example, the memory 710 may be an example of aspects of the memory 1030 described with reference to FIG. 10. Memory 710 may comprise one or more computer-readable storage media. Examples of memory 710 include, but are not limited to, random access memory (RAM), static RAM (SRAM), dynamic RAM (DRAM), read-only memory (ROM), electrically erasable programmable read-only memory (EEPROM), compact disc read-only memory (CD-ROM) or other optical disc storage, magnetic disc storage, or other magnetic storage devices, flash memory, or any other medium that can be used to store desired program code in the form of instructions or data structures and that can be accessed by a computer or a processor (e.g., asset discovery manager 715).

The asset discovery manager 715 may retrieve data stored at one or more remote locations, summarize the retrieved data at the one or more remote locations, transfer the summarized data from the one or more remote locations to the at least one computing device, process the transferred data by the at least one computing device, discover, based on the processing of the transferred data, assets in information technology environments, or in operational technology environments, or in internet-of-things technology environments, or in any combination thereof, that are operating in wired networks or wireless networks, or operating in both, where discovering the assets includes discovering known assets and unknown assets, classify, based on the processing of the transferred data, data that resides on each asset of the discovered assets into a respective confidentiality group of multiple confidentiality groups, calculate, based on the processing of the transferred data, one or more risk scores for the discovered assets or users of the discovered assets, or both, and perform a security action to protect data that resides on an asset of the discovered assets based on a confidentiality group to which the data on the asset is classified and a calculated risk score of the asset or a calculated risk score of a user of the asset, or both. The asset discovery manager 715 may be an example of aspects of the asset discovery manager 1010 described herein.

The asset discovery manager 715, or its sub-components, may be implemented in hardware, code (e.g., software or firmware) executed by a processor, or any combination thereof. If implemented in code executed by a processor, the functions of the asset discovery manager 715, or its sub-components may be executed by a processor, a DSP, an application-specific integrated circuit (ASIC), a FPGA or other programmable logic device, discrete gate or transistor logic, discrete hardware components, or any combination thereof designed to perform the functions described in the present disclosure.

The asset discovery manager 715, or its sub-components, may be physically located at various positions, including being distributed such that portions of functions are implemented at different physical locations by one or more physical components. In some examples, the asset discovery manager 715, or its sub-components, may be a separate and distinct component in accordance with various aspects of the present disclosure. In some examples, the asset discovery manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, processor 720 may process and analyze data in conjunction with asset discovery manager 715. In some examples, processor 720 may or at least some of its sub-components may be implemented in hardware, firmware, software code executed by processor 720, or any combination thereof. The functions of the processor 720 and/or at least some of its various sub-components may be executed in conjunction with asset discovery manager 715, where asset discovery manager 715 may include at least one of a processor, a DSP, an ASIC, an FPGA or other programmable logic device, discrete gate or transistor logic, discrete hardware components, or any combination thereof designed to perform the functions described in the present disclosure.

Figure 8:
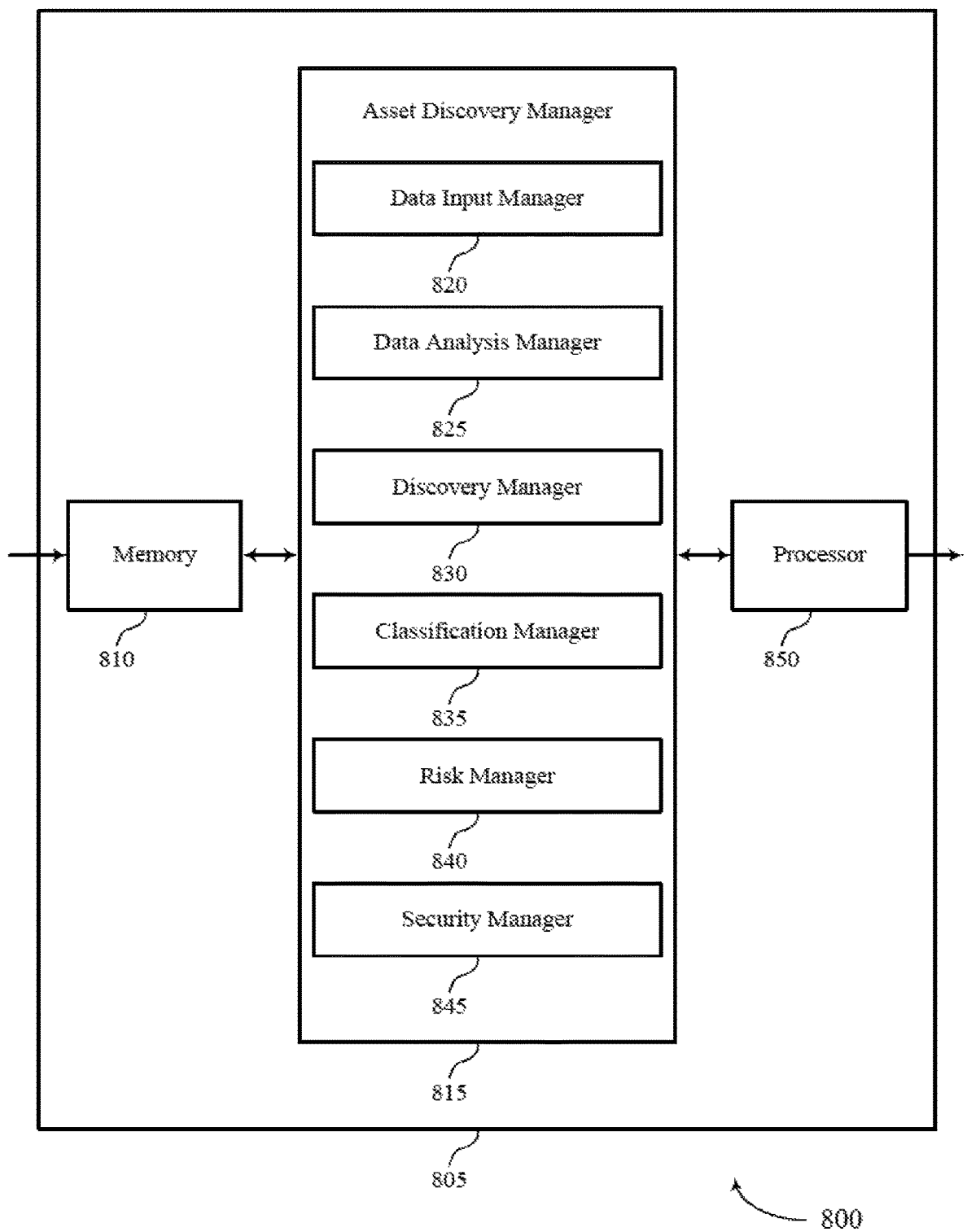

FIG. 8 shows a block diagram 800 of a device 805 that supports asset discovery, user discovery, data classification, risk evaluation, and data/device security in accordance with aspects of the present disclosure. The device 805 may be an example of aspects of a device 105, or a server 110, or a database 115, or a network device of network 120, or a device 705, or any combination thereof. The device 805 may include a memory 810, an asset discovery manager 815, and a processor 850. The device 805 may also include a processor. Each of these components may be in communication with one another (e.g., via one or more buses). The asset discovery manager 815 may be an example of aspects of the asset discovery manager 135 or asset discovery manager 715 as described herein.

The memory 810 may receive, transmit, or store information, data, or signals generated by other components of device 805. In some examples, the memory 810 may be collocated with one or more processors in a computing device (e.g., device 805). In some examples, the memory 810 may be an example of aspects of memory 1030 described with reference to FIG. 10.

The asset discovery manager 815 may be an example of aspects of the asset discovery manager 715 or asset discovery manager 135 as described herein. The asset discovery manager 815 may include a data input manager 820, a data analysis manager 825, a discovery manager 830, a classification manager 835, a risk manager 840, and a security manager 845. The asset discovery manager 815 may be an example of aspects of the asset discovery manager 1010 described herein. The data input manager 820 may be an example of data input module 205. The data analysis manager 825 may be an example of machine learning (ML) engine module 210 or result output module 215, or a combination thereof. The discovery manager 830 may be an example of ML engine module 210 or result output module 215, or a combination thereof. The classification manager 835 may be an example of ML engine module 210 or result output module 215, or a combination thereof. The risk manager 840 may be an example of ML engine module 210 or result output module 215, or a combination thereof. The security manager 845 may be an example of result output module 215 or user interface (UI) module 220, or a combination thereof.

The data input manager 820 may retrieve data stored at one or more remote locations, summarize the retrieved data at the one or more remote locations, and transfer the summarized data from the one or more remote locations to the at least one computing device. The data analysis manager 825 may process the transferred data by the at least one computing device.

The discovery manager 830 may discover, based on the processing of the transferred data, assets in information technology environments, or in operational technology environments, or in internet-of-things technology environments, or in any combination thereof, that are operating in wired networks or wireless networks, or operating in both, where discovering the assets includes discovering known assets and unknown assets.

The classification manager 835 may classify, based on the processing of the transferred data, data that resides on each asset of the discovered assets into a respective confidentiality group of multiple confidentiality groups. The risk manager 840 may calculate, based on the processing of the transferred data, one or more risk scores for the discovered assets or users of the discovered assets, or both.

The security manager 845 may perform a security action to protect data that resides on an asset of the discovered assets based on a confidentiality group to which the data on the asset is classified and a calculated risk score of the asset or a calculated risk score of a user of the asset, or both.

In some examples, processor 850 may process and analyze data in conjunction with asset discovery manager 815 (e.g., processing of alias instructions by asset discovery manager 815). In some examples, processor 850 may or at least some of its sub-components may be implemented in hardware, firmware, software code executed by processor 850, or any combination thereof. The functions of the processor 850 and/or at least some of its various sub-components may be executed in conjunction with asset discovery manager 815, where asset discovery manager 815 may include at least one of a processor, a DSP, an ASIC, an FPGA or other programmable logic device, discrete gate or transistor logic, discrete hardware components, or any combination thereof designed to perform the functions described in the present disclosure.

Figure 9:
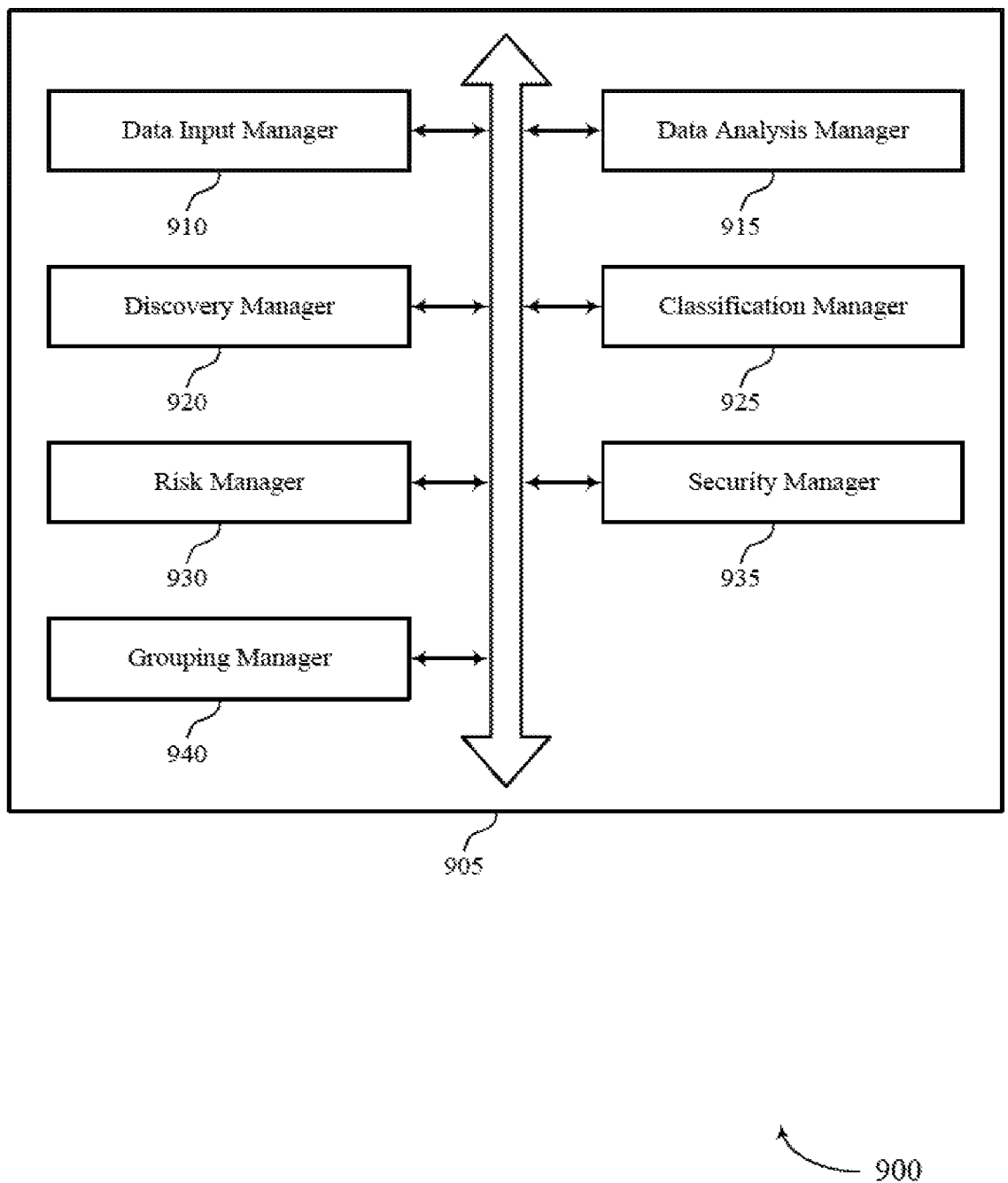
FIG. 9 shows a block diagram of an asset discovery manager that supports asset discovery, user discovery, data classification, risk evaluation, and data/device security in accordance with aspects of the present disclosure.

FIG. 9 shows a block diagram 900 of an asset discovery manager 905 that supports asset discovery, user discovery, data classification, risk evaluation, and data/device security in accordance with aspects of the present disclosure. The asset discovery manager 905 may be an example of aspects of an asset discovery manager 715, an asset discovery manager 815, or an asset discovery manager 1010 described herein. The asset discovery manager 905 may include a data input manager 910, a data analysis manager 915, a discovery manager 920, a classification manager 925, a risk manager 930, a security manager 935, and a grouping manager 940. Each of these modules may communicate, directly or indirectly, with one another (e.g., via one or more buses).

The data input manager 910 may retrieve data stored at one or more remote locations. In some examples, the data input manager 910 may summarize the retrieved data at the one or more remote locations. In some examples, the data input manager 910 may transfer the summarized data from the one or more remote locations to the at least one computing device.

The data analysis manager 915 may process the transferred data by the at least one computing device. In some examples, the data analysis manager 915 may collect and analyzing the set of file sharing logs associated with a set of files. In some examples, the data analysis manager 915 may group entries of the set of file sharing logs by username and by filename.

In some examples, the data analysis manager 915 may remove each file extension and each stop word from filenames of the set of files that are associated with a particular user; tokenizing each word remaining in the filenames associated with the user. In some examples, the data analysis manager 915 may use the tokenized words as bag of words input to train a machine learning topic model.

In some examples, the data analysis manager 915 may use the trained machine learning topic model to classify the data that resides on each asset of the discovered assets, or to determine a respective data topic for the data that resides on each asset of the discovered assets, or to determine a respective data type for the data that resides on each asset of the discovered assets, or any combination thereof.

In some examples, the data analysis manager 915 may cluster, based on the trained machine learning topic model, a set of filenames from the filenames of the transferred data into a text cluster. In some examples, the data analysis manager 915 may select a most frequent word from a set of most frequent words from the set of filenames as a data topic for the text cluster.

In some examples, the data analysis manager 915 may output the text cluster, a username associated with the text cluster, and the selected data topic associated with the text cluster to an asset dataset of at least one of the assets of the discovered assets or to a user dataset of at least one of the users associated with at least one asset of the discovered assets, or both. In some examples, the data analysis manager 915 may identify a server that is a type of server included in a list of server types to be analyzed, the discovered assets including the server.

In some examples, the data analysis manager 915 may analyze, of the set of network flow logs, a network flow log of the server. In some examples, the data analysis manager 915 may determine one or more attributes of the network flow log of the server based on the analyzing. In some examples, the data analysis manager 915 may run a weighted graph model for the server based on the one or more attributes of the server. In some examples, the data analysis manager 915 may determine a model score of the server based on the weighted graph model.

In some examples, the data analysis manager 915 may output the model score and an IP address of the server to an asset dataset of the server, or to a user dataset of at least one of the users associated with the server, or any combination thereof. In some examples, the data analysis manager 915 may collect and analyzing the set of server user activities logs of a set of servers associated with the transferred data. In some examples, the data analysis manager 915 may group entries of the set of server user activities logs by username and by server name.

In some examples, the data analysis manager 915 may attach an organization department of a set of organization departments to each username based on human resource data including associations between each username and the set of organization departments. In some examples, the data analysis manager 915 may calculate, for each server, a total user count and a user count per organization department. In some examples, the data analysis manager 915 may determine, for a server from the set of servers, a highest represented organization department of the server based on the highest represented organization department having the highest user count per organization department.

In some examples, the data analysis manager 915 may determine that a user count for the highest represented organization department of the server satisfies a user count threshold. In some examples, the data analysis manager 915 may apply a data type to the server based on the highest represented organization department. In some examples, the data analysis manager 915 may apply a data classification to the server based on the applied data type.

In some examples, the data analysis manager 915 may collect and analyzing the set of internal network traffic logs of a set of servers of an organization associated with the transferred data. In some examples, the data analysis manager 915 may group entries of the set of internal network traffic logs by source IP address or by destination IP address, or both, for each traffic flow of the set internal network traffic logs. In some examples, the data analysis manager 915 may map, for each asset of the discovered assets associated with a server of the set of servers, an asset source IP address to an asset name, and a username to a name of an asset. In some examples, the data analysis manager 915 may select N assets of the with highest traffic to the server; and applying a data type to the server based on data associated with the N assets with highest traffic to the server.

In some examples, the data analysis manager 915 may collect at least one of a geographic location of the data stored at the one or more remote locations, a source internet protocol (IP) address associated with the data stored at the one or more remote locations, a destination IP address associated with the data stored at the one or more remote locations, one or more preselected database fields associated with the data stored at the one or more remote locations, one or more preselected data fields of the data stored at the one or more remote locations or content from the one or more preselected data fields of the data stored at the one or more remote locations, a preselected portion of the data stored at the one or more remote locations, at least a portion of metadata associated with the data stored at the one or more remote locations, a username associated with the data stored at the one or more remote locations, or any combination thereof.

In some examples, summarizing data on a first data source of the data stored at the one or more remote locations, or filtering the data on the first data source, or summarizing and filtering the data on the first data source, where summarizing the data on the first data source includes collecting or generating a description that describes at least a portion of the data on the first data source, and where filtering the data on the first data source includes permitting a first portion of the data on the first data source to be transferred when transferring the summarized data and blocking a second portion of the data on the first data source from being transferred.

In some examples, bypassing summarizing and filtering of data on a second data source of the data stored at the one or more remote locations, where transferring the summarized data includes transferring the non-summarized and non-filtered data on the second data source, and where the first data source and the second data source include at least one server or at least one database, or both, associated with the data stored at one or more remote locations.

In some examples, using, based on processing the transferred data, network traffic data to discover a user of at least one of the discovered assets, where processing the transferred data by the at least one computing device includes processing the network traffic data that includes remote desktop protocol (RDP) traffic data, or virtual network computing (VNC) traffic data, or secure shell (SSH) traffic data, or remote frame buffer protocol (RFBP) traffic data, or any combination thereof.

In some cases, the one or more attributes of the network flow log of the server includes at least one of an edge weight for the server, one or more components connected to the server, a page rank of the server, a triangle count of nodes associated with the server, a graph centrality of the server, or any combination thereof.

The discovery manager 920 may discover, based on the processing of the transferred data, assets in information technology environments, or in operational technology environments, or in internet-of-things technology environments, or in any combination thereof, that are operating in wired networks or wireless networks, or operating in both, where discovering the assets includes discovering known assets and unknown assets.

The classification manager 925 may classify, based on the processing of the transferred data, data that resides on each asset of the discovered assets into a respective confidentiality group of multiple confidentiality groups.

The risk manager 930 may calculate, based on the processing of the transferred data, one or more risk scores for the discovered assets or users of the discovered assets, or both.

The security manager 935 may perform a security action to protect data that resides on an asset of the discovered assets based on a confidentiality group to which the data on the asset is classified and a calculated risk score of the asset or a calculated risk score of a user of the asset, or both.

The grouping manager 940 may group the transferred data into groups that are grouped by association to one or more of the assets or by association to users of the one or more of the assets, or both.

In some examples, integrating human reinforcing learning and machine accumulative learning with the groups of transferred data, where the transferred data includes at least one of a set of file sharing logs, or a set of network flow logs, or a set of server user activities logs, or a set of internal network traffic logs, or any combination thereof.

Figure 10:
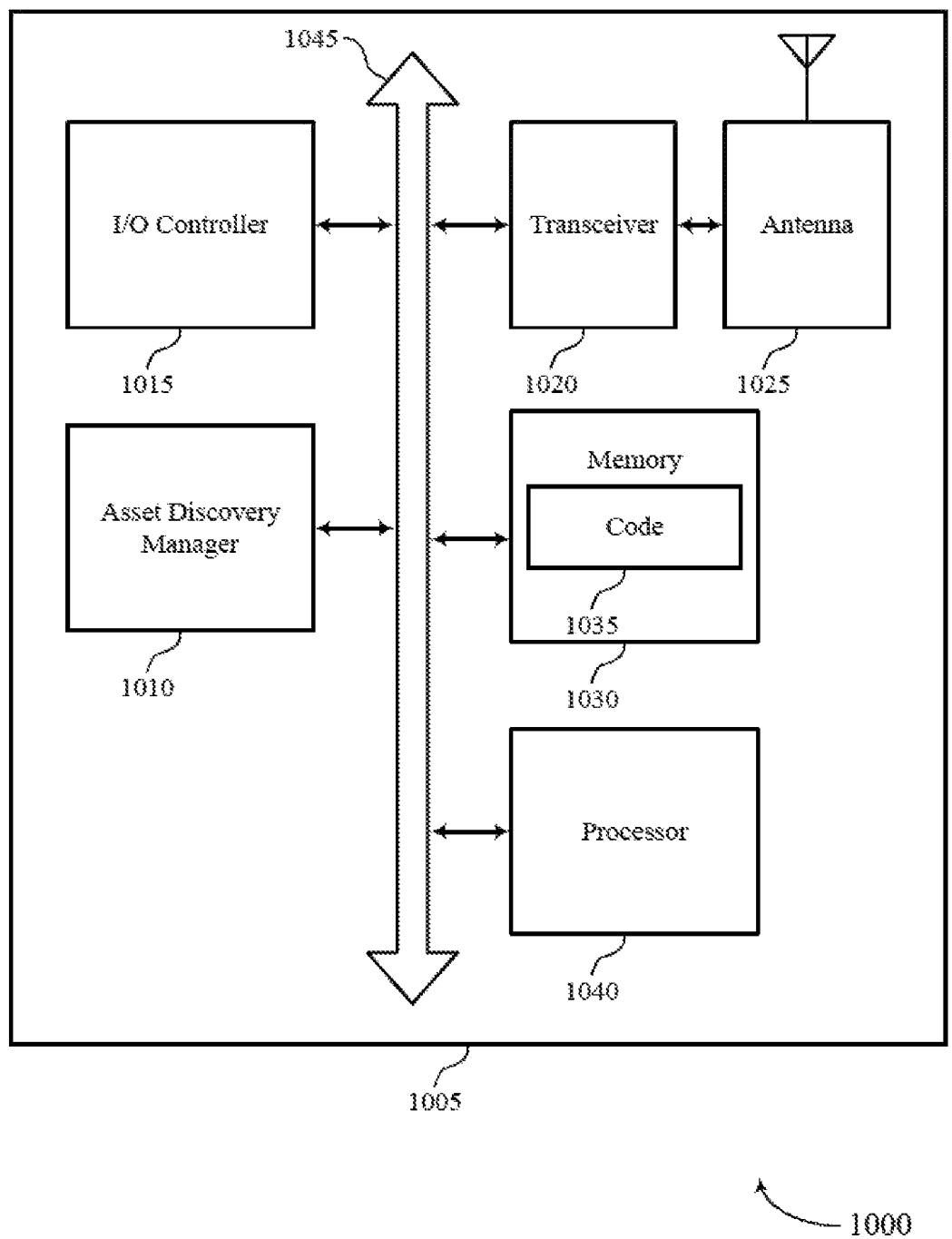
FIG. 10 shows a diagram of a system including a device that supports asset discovery, user discovery, data classification, risk evaluation, and data/device security in accordance with aspects of the present disclosure.

FIG. 10 shows a diagram of a system 1000 including a device 1005 that supports asset discovery, user discovery, data classification, risk evaluation, and data/device security in accordance with aspects of the present disclosure. The device 1005 may be an example of or include the components of device 705, device 805, or a device as described herein. The device 1005 may include components for bi-directional voice and data communications including components for transmitting and receiving communications, including an asset discovery manager 1010, an I/O controller 1015, a transceiver 1020, an antenna 1025, memory 1030, a processor 1040, and a coding manager 1050. These components may be in electronic communication via one or more buses (e.g., bus 1045).

The asset discovery manager 1010 may retrieve data stored at one or more remote locations, summarize the retrieved data at the one or more remote locations, transfer the summarized data from the one or more remote locations to the at least one computing device, process the transferred data by the at least one computing device, discover, based on the processing of the transferred data, assets in information technology environments, or in operational technology environments, or in internet-of-things technology environments, or in any combination thereof, that are operating in wired networks or wireless networks, or operating in both, where discovering the assets includes discovering known assets and unknown assets, classify, based on the processing of the transferred data, data that resides on each asset of the discovered assets into a respective confidentiality group of multiple confidentiality groups, calculate, based on the processing of the transferred data, one or more risk scores for the discovered assets or users of the discovered assets, or both, and perform a security action to protect data that resides on an asset of the discovered assets based on a confidentiality group to which the data on the asset is classified and a calculated risk score of the asset or a calculated risk score of a user of the asset, or both.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting asset discovery, user discovery, data classification, risk evaluation, and data/device security).

The code 1035 may include instructions to implement aspects of the present disclosure, including instructions to support asset discovery. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
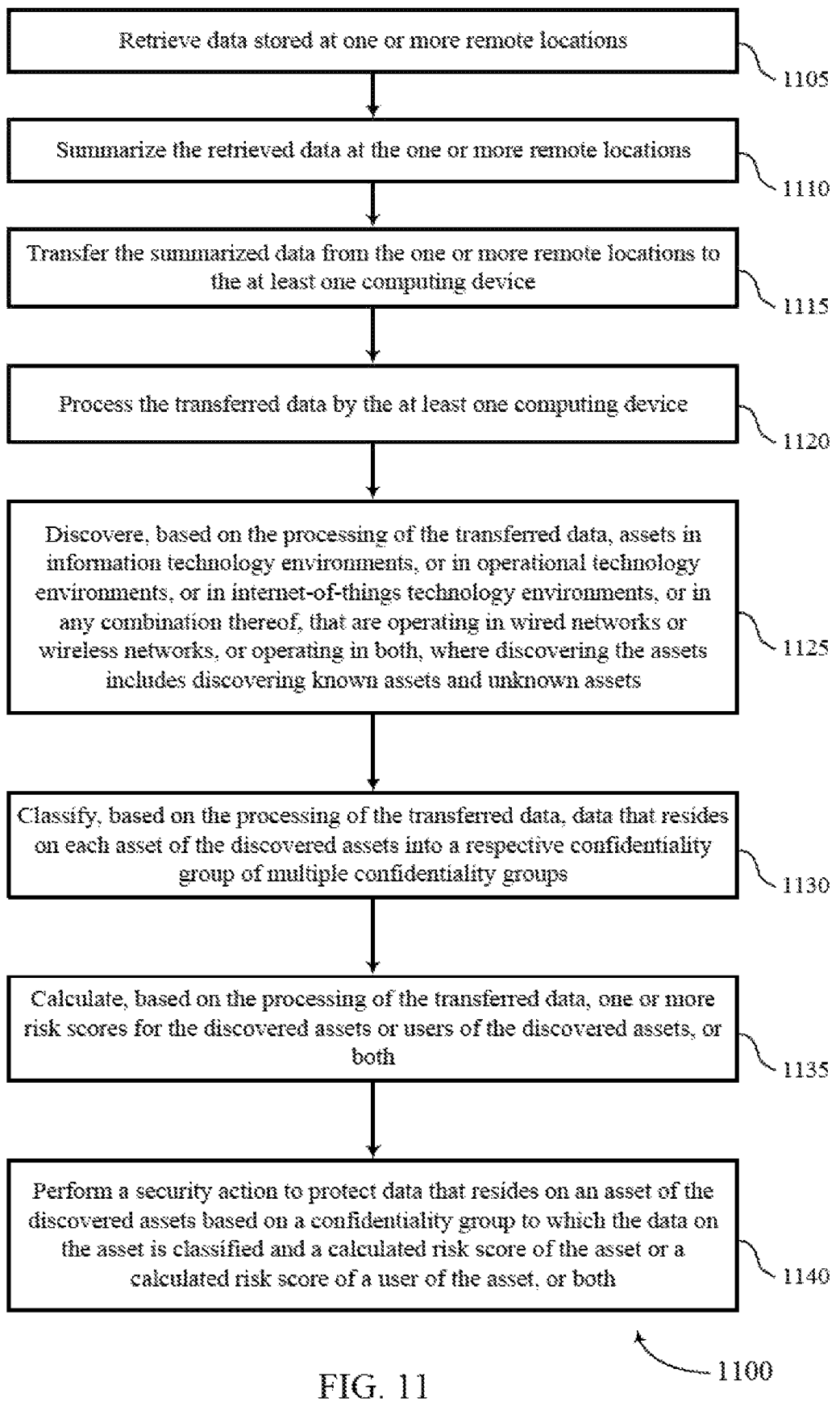
FIGS. 11 and 12 show flowcharts illustrating methods that support asset discovery, user discovery, data classification, risk evaluation, and data/device security in accordance with aspects of the present disclosure.

FIG. 11 shows a flowchart illustrating a method 1100 that supports asset discovery, user discovery, data classification, risk evaluation, and data/device security in accordance with aspects of the present disclosure. The operations of method 1100 may be implemented by a device or its components as described herein. For example, the operations of method 1100 may be performed by an asset discovery manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1105, the device may retrieve data stored at one or more remote locations. The operations of 1105 may be performed according to the methods described herein. In some examples, aspects of the operations of 1105 may be performed by a data input manager as described with reference to FIGS. 7 through 10.

At 1110, the device may summarize the retrieved data at the one or more remote locations. The operations of 1110 may be performed according to the methods described herein. In some examples, aspects of the operations of 1110 may be performed by a data input manager as described with reference to FIGS. 7 through 10.

At 1115, the device may transfer the summarized data from the one or more remote locations to the at least one computing device. The operations of 1115 may be performed according to the methods described herein. In some examples, aspects of the operations of 1115 may be performed by a data input manager as described with reference to FIGS. 7 through 10.

At 1120, the device may process the transferred data by the at least one computing device. The operations of 1120 may be performed according to the methods described herein. In some examples, aspects of the operations of 1120 may be performed by a data analysis manager as described with reference to FIGS. 7 through 10.

At 1125, the device may discover, based on the processing of the transferred data, assets in information technology environments, or in operational technology environments, or in internet-of-things technology environments, or in any combination thereof, that are operating in wired networks or wireless networks, or operating in both, where discovering the assets includes discovering known assets and unknown assets. The operations of 1125 may be performed according to the methods described herein. In some examples, aspects of the operations of 1125 may be performed by a discovery manager as described with reference to FIGS. 7 through 10.

At 1130, the device may classify, based on the processing of the transferred data, data that resides on each asset of the discovered assets into a respective confidentiality group of multiple confidentiality groups. The operations of 1130 may be performed according to the methods described herein. In some examples, aspects of the operations of 1130 may be performed by a classification manager as described with reference to FIGS. 7 through 10.

At 1135, the device may calculate, based on the processing of the transferred data, one or more risk scores for the discovered assets or users of the discovered assets, or both. The operations of 1135 may be performed according to the methods described herein. In some examples, aspects of the operations of 1135 may be performed by a risk manager as described with reference to FIGS. 7 through 10.

At 1140, the device may perform a security action to protect data that resides on an asset of the discovered assets based on a confidentiality group to which the data on the asset is classified and a calculated risk score of the asset or a calculated risk score of a user of the asset, or both. The operations of 1140 may be performed according to the methods described herein. In some examples, aspects of the operations of 1140 may be performed by a security manager as described with reference to FIGS. 7 through 10.

Figure 12:
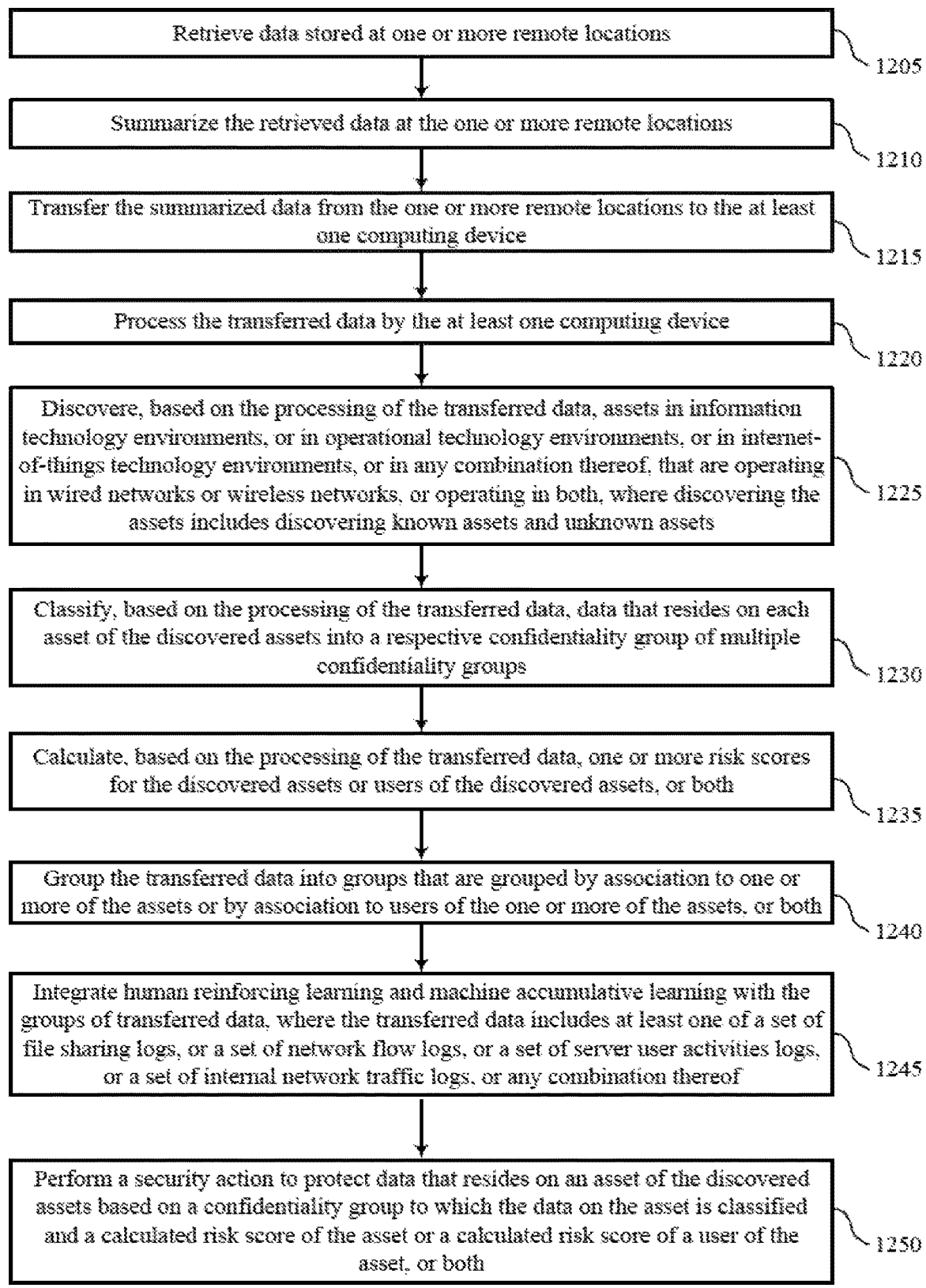

FIG. 12 shows a flowchart illustrating a method 1200 that supports asset discovery, user discovery, data classification, risk evaluation, and data/device security in accordance with aspects of the present disclosure. The operations of method 1200 may be implemented by a device or its components as described herein. For example, the operations of method 1200 may be performed by an asset discovery manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1205, the device may retrieve data stored at one or more remote locations. The operations of 1205 may be performed according to the methods described herein. In some examples, aspects of the operations of 1205 may be performed by a data input manager as described with reference to FIGS. 7 through 10.

At 1210, the device may summarize the retrieved data at the one or more remote locations. The operations of 1210 may be performed according to the methods described herein. In some examples, aspects of the operations of 1210 may be performed by a data input manager as described with reference to FIGS. 7 through 10.

At 1215, the device may transfer the summarized data from the one or more remote locations to the at least one computing device. The operations of 1215 may be performed according to the methods described herein. In some examples, aspects of the operations of 1215 may be performed by a data input manager as described with reference to FIGS. 7 through 10.

At 1220, the device may process the transferred data by the at least one computing device. The operations of 1220 may be performed according to the methods described herein. In some examples, aspects of the operations of 1220 may be performed by a data analysis manager as described with reference to FIGS. 7 through 10.

At 1225, the device may discover, based on the processing of the transferred data, assets in information technology environments, or in operational technology environments, or in internet-of-things technology environments, or in any combination thereof, that are operating in wired networks or wireless networks, or operating in both, where discovering the assets includes discovering known assets and unknown assets. The operations of 1225 may be performed according to the methods described herein. In some examples, aspects of the operations of 1225 may be performed by a discovery manager as described with reference to FIGS. 7 through 10.

At 1230, the device may classify, based on the processing of the transferred data, data that resides on each asset of the discovered assets into a respective confidentiality group of multiple confidentiality groups. The operations of 1230 may be performed according to the methods described herein. In some examples, aspects of the operations of 1230 may be performed by a classification manager as described with reference to FIGS. 7 through 10.

At 1235, the device may calculate, based on the processing of the transferred data, one or more risk scores for the discovered assets or users of the discovered assets, or both. The operations of 1235 may be performed according to the methods described herein. In some examples, aspects of the operations of 1235 may be performed by a risk manager as described with reference to FIGS. 7 through 10.

At 1240, the device may group the transferred data into groups that are grouped by association to one or more of the assets or by association to users of the one or more of the assets, or both. The operations of 1240 may be performed according to the methods described herein. In some examples, aspects of the operations of 1240 may be performed by a grouping manager as described with reference to FIGS. 7 through 10.

At 1245, the device may integrate human reinforcing learning and machine accumulative learning with the groups of transferred data, where the transferred data includes at least one of a set of file sharing logs, or a set of network flow logs, or a set of server user activities logs, or a set of internal network traffic logs, or any combination thereof. The operations of 1245 may be performed according to the methods described herein. In some examples, aspects of the operations of 1245 may be performed by a grouping manager as described with reference to FIGS. 7 through 10.

At 1250, the device may perform a security action to protect data that resides on an asset of the discovered assets based on a confidentiality group to which the data on the asset is classified and a calculated risk score of the asset or a calculated risk score of a user of the asset, or both. The operations of 1250 may be performed according to the methods described herein. In some examples, aspects of the operations of 1250 may be performed by a security manager as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks, modules, and/or managers described in connection with the disclosure herein may be implemented or performed by a processor, a DSP, an ASIC, an FPGA, or other programmable logic device, discrete gate or transistor logic, discrete hardware components, or any combination thereof designed to perform the functions described herein. A processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, read-only memory ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The foregoing description, for purpose of explanation, has been described with reference to specific cases. However, the illustrative discussions above are not intended to be exhaustive or to limit the invention to the precise forms disclosed. Many modifications and variations are possible in view of the above teachings. The cases were chosen and described in order to best explain the principles of the present techniques and their practical applications, to thereby enable others skilled in the art to best utilize the present techniques and various cases with various modifications as may be suited to the particular use contemplated.

Unless otherwise noted, the terms "a" or "an," as used in the specification and claims, are to be construed as meaning "at least one of" In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems, devices, processors, modules, or managers described herein may take after determining a packet injection. For example, types of security actions may include preventing a data packet from performing an action on a computing device, alerting an administrator to the potential maliciousness of data, a connection, or a device, quarantining a file related to an asset or a connection, deleting a file, blocking a download of a file, and/or warning a user about a connection or device. In some examples, the systems, devices, and managers/modules described herein may perform a security action on objects other than a file. For example, the systems, devices, and managers/modules described herein may blacklist users, devices, malicious URLs, and/or internet protocol (IP) addresses. Thus, the security actions in conjunction with the methods and systems described herein may improve the security and operating integrity of one or more computing devices by protecting the hardware, or firmware, or software, or any combination thereof, of the one or more computing devices from malicious attack. It should be appreciated that these are not exhaustive lists of the types of security actions which may be performed by the systems described herein. Other security actions are also included in this disclosure.

What is claimed is:

1. A method for asset discovery, data classifications and protection, the method being performed by at least one computing device comprising at least one processor, the method comprising:
   retrieving data stored at one or more remote locations;
   summarizing the retrieved data at the one or more remote locations;
   transferring the summarized data from the one or more remote locations to the at least one computing device;
   processing the transferred data by the at least one computing device;
   discovering, based at least in part on the processing of the transferred data, assets in information technology environments, or in operational technology environments, or in internet-of-things technology environments, or in any combination thereof, that are operating in wired networks or wireless networks, or operating in both, wherein discovering the assets includes discovering known assets and unknown assets;
   classifying, based at least in part on the processing of the transferred data, data that resides on each asset of the discovered assets into a respective confidentiality group of multiple confidentiality groups;
   calculating, based at least in part on the processing of the transferred data, one or more risk scores for the discovered assets or users of the discovered assets, or both; and
   performing a security action to protect data that resides on an asset of the discovered assets based at least in part on a confidentiality group to which the data on the asset is classified and a calculated risk score of the asset or a calculated risk score of a user of the asset, or both.

2. The method of claim 1, wherein calculating the one or more risk scores comprises:

grouping the transferred data into groups that are grouped by association to one or more of the assets or by association to users of the one or more of the assets, or both; and integrating human reinforcing learning and machine accumulative learning with the groups of transferred data, wherein the transferred data comprises at least one of a plurality of file sharing logs, or a plurality of network flow logs, or a plurality of server user activities logs, or a plurality of internal network traffic logs, or any combination thereof.

3. The method of claim 2, wherein processing the transferred data comprises:

collecting and analyzing the plurality of file sharing logs associated with a plurality of files; and grouping entries of the plurality of file sharing logs by username and by filename.

4. The method of claim 3, further comprising:

removing each file extension and each stop word from filenames of the plurality of files that are associated with a particular user; tokenizing each word remaining in the filenames associated with the user;

using the tokenized words as bag of words input to train a machine learning topic model; and using the trained machine learning topic model to classify the data that resides on each asset of the discovered assets, or to determine a respective data topic for the data that resides on each asset of the discovered assets, or to determine a respective data type for the data that resides on each asset of the discovered assets, or any combination thereof.

5. The method of claim 4, further comprising:

clustering, based at least in part on the trained machine learning topic model, a set of filenames from the filenames of the transferred data into a text cluster;

selecting a most frequent word from a set of most frequent words from the set of filenames as a data topic for the text cluster; and outputting the text cluster, a username associated with the text cluster, and the selected data topic associated with the text cluster to an asset dataset of at least one of the assets of the discovered assets or to a user dataset of at least one of the users associated with at least one asset of the discovered assets, or both.

6. The method of claim 2, wherein processing the transferred data comprises:

identifying a server that is a type of server included in a list of server types to be analyzed, the discovered assets comprising the server;

analyzing, of the plurality of network flow logs, a network flow log of the server; and determining one or more attributes of the network flow log of the server based at least in part on the analyzing.

7. The method of claim 6, wherein the one or more attributes of the network flow log of the server comprises at least one of an edge weight for the server, one or more components connected to the server, a page rank of the server, a triangle count of nodes associated with the server, a graph centrality of the server, or any combination thereof.

8. The method of claim 7, further comprising:

running a weighted graph model for the server based at least in part on the one or more attributes of the server;

determining a model score of the server based at least in part on the weighted graph model; and outputting the model score and an IP address of the server to an asset dataset of the server, or to a user dataset of at least one of the users associated with the server, or any combination thereof.

9. The method of claim 2, wherein processing the transferred data comprises:

collecting and analyzing the plurality of server user activities logs of a plurality of servers associated with the transferred data; and grouping entries of the plurality of server user activities logs by username and by server name.

10. The method of claim 9, further comprising:

attaching an organization department of a plurality of organization departments to each username based at least in part on human resource data comprising associations between each username and the plurality of organization departments; and calculating, for each server, a total user count and a user count per organization department.

11. The method of claim 10, further comprising:

determining, for a server from the plurality of servers, a highest represented organization department of the server based at least in part on the highest represented organization department having the highest user count per organization department;

determining that a user count for the highest represented organization department of the server satisfies a user count threshold;

applying a data type to the server based at least in part on the highest represented organization department; and applying a data classification to the server based at least in part on the applied data type.

12. The method of claim 2, wherein processing the transferred data comprises:

collecting and analyzing the plurality of internal network traffic logs of a plurality of servers of an organization associated with the transferred data; and grouping entries of the plurality of internal network traffic logs by source IP address or by destination IP address, or both, for each traffic flow of the plurality internal network traffic logs.

13. The method of claim 12, further comprising:

mapping, for each asset of the discovered assets associated with a server of the plurality of servers, an asset source IP address to an asset name, and a username to a name of an asset;

selecting N assets of the with highest traffic to the server; and applying a data type to the server based at least in part on data associated with the N assets with highest traffic to the server applying a data classification to the server based at least in part on the applied data type.

14. The method of claim 1, wherein summarizing the retrieved data stored at the one or more remote locations comprises:

collecting at least one of a geographic location of the data stored at the one or more remote locations, a source internet protocol (IP) address associated with the data stored at the one or more remote locations, a destination IP address associated with the data stored at the one or more remote locations, one or more preselected database fields associated with the data stored at the one or more remote locations, one or more preselected data fields of the data stored at the one or more remote locations or content from the one or more preselected data fields of the data stored at the one or more remote locations, a preselected portion of the data stored at the one or more remote locations, at least a portion of metadata associated with the data stored at the one or more remote locations, a username associated with the data stored at the one or more remote locations, or any combination thereof.

15. The method of claim 1, wherein summarizing the retrieved data stored at the one or more remote locations comprises:
summarizing data on a first data source of the data stored at the one or more remote locations, or filtering the data on the first data source, or summarizing and filtering the data on the first data source, wherein summarizing the data on the first data source comprises collecting or generating a description that describes at least a portion of the data on the first data source, and wherein filtering the data on the first data source comprises permitting a first portion of the data on the first data source to be transferred when transferring the summarized data and blocking a second portion of the data on the first data source from being transferred.

16. The method of claim 15, further comprising:
bypassing summarizing and filtering of data on a second data source of the data stored at the one or more remote locations, wherein transferring the summarized data comprises transferring the non-summarized and non-filtered data on the second data source, and wherein the first data source and the second data source comprise at least one server or at least one database, or both, associated with the data stored at one or more remote locations.

17. The method of claim 1, further comprising:
using, based at least in part on processing the transferred data, network traffic data to discover a user of at least one of the discovered assets, wherein processing the transferred data by the at least one computing device comprises processing the network traffic data that comprises remote desktop protocol (RDP) traffic data, or virtual network computing (VNC) traffic data, or secure shell (SSH) traffic data, or remote frame buffer protocol (RFBP) traffic data, or any combination thereof.

18. An apparatus for asset discovery, data class:
a processor,
memory coupled with the processor; and
instructions stored in the memory and executable by the processor to cause the apparatus to:
retrieve data stored at one or more remote locations;
summarize the retrieved data at the one or more remote locations;
transfer the summarized data from the one or more remote locations to the at least one computing device;
process the transferred data by the at least one computing device;
discover, based at least in part on the processing of the transferred data, assets in information technology environments, or in operational technology environments, or in internet-of-things technology environments, or in any combination thereof, that are operating in wired networks or wireless networks, or operating in both, wherein discovering the assets includes discovering known assets and unknown assets;
classify, based at least in part on the processing of the transferred data, data that resides on each asset of the discovered assets into a respective confidentiality group of multiple confidentiality groups;
calculate, based at least in part on the processing of the transferred data, one or more risk scores for the discovered assets or users of the discovered assets, or both; and
perform a security action to protect data that resides on an asset of the discovered assets based at least in part on a confidentiality group to which the data on the asset is classified and a calculated risk score of the asset or a calculated risk score of a user of the asset, or both.

19. The apparatus of claim 18, wherein the instructions to calculate the one or more risk scores are executable by the processor to cause the apparatus to:
group the transferred data into groups that are grouped by association to one or more of the assets or by association to users of the one or more of the assets, or both; and
integrate human reinforcing learning and machine accumulative learning with the groups of transferred data, wherein the transferred data comprises at least one of a plurality of file sharing logs, or a plurality of network flow logs, or a plurality of server user activities logs, or a plurality of internal network traffic logs, or any combination thereof.

20. A non-transitory computer-readable medium storing code for asset discovery, data classifications and protection, the method being performed by at least one computing device comprising at least one processor, the method comprising, the code comprising instructions executable by a processor to:
retrieve data stored at one or more remote locations;
summarize the retrieved data at the one or more remote locations;
transfer the summarized data from the one or more remote locations to the at least one computing device;
process the transferred data by the at least one computing device;
discover, based at least in part on the processing of the transferred data, assets in information technology environments, or in operational technology environments, or in internet-of-things technology environments, or in any combination thereof, that are operating in wired networks or wireless networks, or operating in both, wherein discovering the assets includes discovering known assets and unknown assets;
classify, based at least in part on the processing of the transferred data, data that resides on each asset of the discovered assets into a respective confidentiality group of multiple confidentiality groups;
calculate, based at least in part on the processing of the transferred data, one or more risk scores for the discovered assets or users of the discovered assets, or both; and
perform a security action to protect data that resides on an asset of the discovered assets based at least in part on a confidentiality group to which the data on the asset is classified and a calculated risk score of the asset or a calculated risk score of a user of the asset, or both.

* * * * *